(12) United States Patent
Ortiz

(10) Patent No.: US 11,599,879 B2
(45) Date of Patent: Mar. 7, 2023

(54) PROCESSING OF ELECTRONIC TRANSACTIONS

(71) Applicant: Royal Bank of Canada, Montreal (CA)

(72) Inventor: Edison U. Ortiz, Orlando, FL (US)

(73) Assignee: ROYAL BANK OF CANADA, Montreal (CA)

( * ) Notice: Subject to any disclaimer, the term of this patent is extended or adjusted under 35 U.S.C. 154(b) by 207 days.

(21) Appl. No.: 15/648,942

(22) Filed: Jul. 13, 2017

(65) Prior Publication Data

US 2017/0330181 A1 Nov. 16, 2017

Related U.S. Application Data

(63) Continuation-in-part of application No. 15/201,428, filed on Jul. 2, 2016, now Pat. No. 11,080,701, and a
(Continued)

(51) Int. Cl.
*G06Q 20/40* (2012.01)
*G06Q 30/02* (2012.01)
(Continued)

(52) U.S. Cl.
CPC .......... *G06Q 20/40* (2013.01); *G06Q 20/023* (2013.01); *G06Q 20/12* (2013.01);
(Continued)

(58) Field of Classification Search
None
See application file for complete search history.

(56) References Cited

U.S. PATENT DOCUMENTS

| 5,668,760 A | 9/1997 | Hazen |
| 5,668,876 A | 9/1997 | Falk et al. |

(Continued)

FOREIGN PATENT DOCUMENTS

| CA | 2837208 | 12/2012 |
| CA | 2852059 | 4/2013 |

(Continued)

OTHER PUBLICATIONS

Knott, What is Private Key Encryption?, 2014, entire document pertinent, retrieved from https://web.archive.org/web/20140306101755/http://www.koolspan.com/blog/private-key-encryption/ (Year: 2014).*

(Continued)

*Primary Examiner* — Gregory S Cunningham, II
(74) *Attorney, Agent, or Firm* — Norton Rose Fulbright Canada LLP

(57) ABSTRACT

Systems 100; devices 110, 120, 130, 150, 160; methods 2400, 2500; and machine-executable programming structures stored in persistent (i.e., non-transitory), computer-readable media 604, 606, 618, 126, 139 for the rapid and secure negotiation, authorization, execution, and confirmation of multi-party data processes, including payment transactions conducted between purchasers 190 having electronic access to bank accounts and other sources of payment, merchants operating e- and/or m-commerce transaction systems 132, 134, 136, and banks and other financial institutions 120 capable of electronically communicating with both.

19 Claims, 9 Drawing Sheets

Related U.S. Application Data continuation-in-part of application No. 15/000,685, filed on Jan. 19, 2016, now Pat. No. 11,080,700.

(60) Provisional application No. 62/361,919, filed on Jul. 13, 2016, provisional application No. 62/200,859, filed on Aug. 4, 2015, provisional application No. 62/188,067, filed on Jul. 2, 2015.

(51) Int. Cl.
| | |
|---|---|
| *G06Q 20/32* | (2012.01) |
| *G06Q 20/38* | (2012.01) |
| *G06Q 20/02* | (2012.01) |
| *G06Q 20/12* | (2012.01) |
| *G06Q 30/0226* | (2023.01) |

(52) U.S. Cl.
CPC ....... *G06Q 20/3223* (2013.01); *G06Q 20/385* (2013.01); *G06Q 30/0226* (2013.01)

(56) References Cited

U.S. PATENT DOCUMENTS

| | | | |
|---|---|---|---|
| 6,439,464 B1 | 8/2002 | Fruhauf et al. | |
| 6,763,399 B2 | 7/2004 | Margalit et al. | |
| 6,883,715 B1 | 4/2005 | Fruhauf et al. | |
| 6,988,657 B1 | 1/2006 | Singer et al. | |
| 6,991,173 B2 | 1/2006 | Fruhauf | |
| 7,011,247 B2 | 3/2006 | Drabczuk et al. | |
| 7,150,397 B2 | 12/2006 | Morrow et al. | |
| 7,249,266 B2 | 7/2007 | Marglait et al. | |
| 7,438,218 B2 | 10/2008 | Dooley et al. | |
| 7,529,700 B1 | 5/2009 | Kessler | |
| 7,647,404 B2 | 1/2010 | Cooper et al. | |
| 7,761,380 B2 | 7/2010 | Katz | |
| 7,848,980 B2 | 12/2010 | Carlson | |
| 8,046,495 B2 | 10/2011 | Cooper et al. | |
| 8,112,353 B2 | 2/2012 | Li et al. | |
| 8,121,874 B1 | 2/2012 | Guheen et al. | |
| 8,151,345 B1 | 4/2012 | Yeager | |
| 8,260,199 B2 | 9/2012 | Kowalski | |
| 8,332,272 B2 | 12/2012 | Fisher | |
| 8,352,749 B2 | 1/2013 | von Behren et al. | |
| 8,391,837 B2 | 3/2013 | Corda | |
| 8,417,643 B2 | 4/2013 | Mardikar | |
| 8,468,580 B1 | 6/2013 | Casey et al. | |
| 8,548,924 B2 | 10/2013 | Yeager | |
| 8,549,279 B1 | 10/2013 | Sahasranaman et al. | |
| 8,560,449 B1 | 10/2013 | Sears et al. | |
| 8,655,787 B1 | 2/2014 | Griffin et al. | |
| 8,682,802 B1 | 3/2014 | Kannanari | |
| 8,686,802 B1 | 3/2014 | Kannanari | |
| 8,751,294 B2 | 6/2014 | Bhattacharya | |
| 8,818,867 B2 | 8/2014 | Baldwin et al. | |
| 9,082,119 B2 | 7/2015 | Ortiz et al. | |
| 9,177,313 B1 | 11/2015 | Silverman | |
| 9,195,984 B1 | 11/2015 | Spector | |
| 9,269,083 B1 | 2/2016 | Jarajapu | |
| 9,305,295 B2 | 4/2016 | Laracey | |
| 9,336,519 B2 * | 5/2016 | Young ................... | G06Q 40/02 |
| 9,715,681 B2 | 7/2017 | Hammad | |
| 9,721,238 B2 | 8/2017 | Salmon | |
| 9,792,593 B2 | 10/2017 | Hayhow et al. | |
| 9,836,727 B1 | 12/2017 | Brennan | |
| 9,836,739 B1 | 12/2017 | Borovsky | |
| 10,055,740 B2 | 8/2018 | Hanson | |
| 10,521,780 B1 | 12/2019 | Hopkins | |
| 11,232,456 B2 | 1/2022 | Hyun | |
| 2002/0002538 A1 | 1/2002 | Ling | |
| 2002/0169984 A1 | 11/2002 | Kumar | |
| 2003/0028481 A1 | 2/2003 | Flitcroft | |
| 2004/0073688 A1 | 4/2004 | Sampson | |
| 2005/0097060 A1 | 5/2005 | Lee et al. | |
| 2006/0080545 A1 | 4/2006 | Bagly et al. | |
| 2006/0235761 A1 | 10/2006 | Johnson | |
| 2006/0235795 A1 | 10/2006 | Johnson | |
| 2006/0235796 A1 | 10/2006 | Johnson | |
| 2006/0255158 A1 | 11/2006 | Margalit et al. | |
| 2007/0088952 A1 | 4/2007 | Hewitt et al. | |
| 2007/0125838 A1 | 6/2007 | Law et al. | |
| 2007/0143828 A1 | 6/2007 | Jeal | |
| 2007/0255653 A1 | 11/2007 | Tumminaro et al. | |
| 2007/0256124 A1 | 11/2007 | Ih | |
| 2008/0040285 A1 | 2/2008 | Wankmueller | |
| 2008/0072064 A1 | 3/2008 | Franchi | |
| 2008/0103923 A1 | 5/2008 | Rieck et al. | |
| 2008/0133350 A1 | 6/2008 | White | |
| 2008/0163257 A1 | 7/2008 | Carlson | |
| 2008/0283591 A1 | 11/2008 | Oder et al. | |
| 2009/0064294 A1 | 3/2009 | Cook | |
| 2009/0104886 A1 | 4/2009 | Minamino et al. | |
| 2009/0104888 A1 | 4/2009 | Cox | |
| 2009/0240620 A1 | 9/2009 | Kendrick et al. | |
| 2009/0254440 A1 | 10/2009 | Pharris | |
| 2009/0271262 A1 | 10/2009 | Hammad | |
| 2009/0294527 A1 | 12/2009 | Brabson et al. | |
| 2010/0030697 A1 | 2/2010 | Goodrich et al. | |
| 2010/0042538 A1 | 2/2010 | Dheer et al. | |
| 2010/0063893 A1 | 3/2010 | Townsend | |
| 2010/0094755 A1 | 4/2010 | Kloster | |
| 2010/0145860 A1 | 6/2010 | Pelegero | |
| 2010/0148928 A1 | 6/2010 | Yeager et al. | |
| 2010/0241867 A1 | 9/2010 | Brown | |
| 2010/0257612 A1 | 10/2010 | McGuire et al. | |
| 2010/0274692 A1 | 10/2010 | Hammad | |
| 2010/0306076 A1 | 12/2010 | Taveau et al. | |
| 2011/0161233 A1 | 6/2011 | Tieken | |
| 2011/0166992 A1 | 7/2011 | Dessert | |
| 2011/0208659 A1 | 8/2011 | Easterly et al. | |
| 2011/0225090 A1 | 9/2011 | Hammad | |
| 2011/0251892 A1 | 10/2011 | Laracey | |
| 2011/0307710 A1 | 12/2011 | McGuire et al. | |
| 2011/0320344 A1 | 12/2011 | Faith et al. | |
| 2012/0005038 A1 | 1/2012 | Soman | |
| 2012/0028609 A1 | 2/2012 | Hruska | |
| 2012/0030044 A1 | 2/2012 | Hurst | |
| 2012/0030047 A1 * | 2/2012 | Fuentes ................ | G06Q 20/326 |
| | | | 705/26.1 |
| 2012/0031969 A1 | 2/2012 | Hammad | |
| 2012/0036042 A1 | 2/2012 | Graylin | |
| 2012/0041881 A1 | 2/2012 | Basu et al. | |
| 2012/0078735 A1 | 3/2012 | Bauer et al. | |
| 2012/0078782 A1 | 3/2012 | Schoenberg et al. | |
| 2012/0084210 A1 | 4/2012 | Farahmand | |
| 2012/0116902 A1 | 5/2012 | Cardina et al. | |
| 2012/0131655 A1 | 5/2012 | Bender et al. | |
| 2012/0150668 A1 | 6/2012 | Wade | |
| 2012/0159163 A1 | 6/2012 | von Behren | |
| 2012/0173432 A1 | 7/2012 | Yeager | |
| 2012/0197797 A1 | 8/2012 | Grigg | |
| 2012/0203700 A1 | 8/2012 | Ornce et al. | |
| 2012/0209657 A1 | 8/2012 | Connolly | |
| 2012/0209749 A1 | 8/2012 | Hammad | |
| 2012/0214443 A1 | 8/2012 | Daigle | |
| 2012/0239417 A1 | 9/2012 | Pourfallah et al. | |
| 2012/0259782 A1 | 10/2012 | Hammad | |
| 2012/0260324 A1 | 10/2012 | Lenon et al. | |
| 2012/0267432 A1 | 10/2012 | Kuttuva | |
| 2012/0271705 A1 | 10/2012 | Postrel | |
| 2012/0259781 A1 | 11/2012 | Fote et al. | |
| 2012/0290376 A1 * | 11/2012 | Dryer ................... | G06Q 20/385 |
| | | | 705/14.23 |
| 2012/0296725 A1 | 11/2012 | Dessert | |
| 2012/0316992 A1 | 12/2012 | Oborne | |
| 2012/0317036 A1 | 12/2012 | Bower et al. | |
| 2012/0317628 A1 | 12/2012 | Yeager | |
| 2013/0006860 A1 | 1/2013 | Balasubramanian et al. | |
| 2013/0018793 A1 * | 1/2013 | Wong ................ | G06Q 20/4097 |
| | | | 705/44 |
| 2013/0024383 A1 | 1/2013 | Kannappan | |
| 2013/0031006 A1 | 1/2013 | McCullagh et al. | |
| 2013/0036048 A1 | 2/2013 | Campos et al. | |
| 2013/0041823 A1 | 2/2013 | Wagner | |
| 2013/0054474 A1 | 2/2013 | Yeager | |

(56) References Cited

U.S. PATENT DOCUMENTS

| | | |
|---|---|---|
| 2013/0030618 A1 | 3/2013 | Barton et al. |
| 2013/0060618 A1 | 3/2013 | Barton et al. |
| 2013/0060708 A1 | 3/2013 | Oskolkov et al. |
| 2013/0091061 A1 | 4/2013 | Caulkett et al. |
| 2013/0095810 A1 | 4/2013 | Moreton et al. |
| 2013/0097081 A1 | 4/2013 | Leavitt et al. |
| 2013/0110658 A1 | 5/2013 | Lyman et al. |
| 2013/0110675 A1 | 5/2013 | Bouw |
| 2013/0124346 A1 | 5/2013 | Baldwin et al. |
| 2013/0138521 A1 | 5/2013 | Want et al. |
| 2013/0151405 A1 | 6/2013 | Head et al. |
| 2013/0166913 A1 | 6/2013 | Lenon |
| 2013/0179352 A1 | 7/2013 | Dwyre |
| 2013/0214898 A1 | 8/2013 | Pineau et al. |
| 2013/0218657 A1 | 8/2013 | Salmon |
| 2013/0218769 A1 | 8/2013 | Pourfallah et al. |
| 2013/0238455 A1 | 9/2013 | Laracey |
| 2013/0254117 A1 | 9/2013 | von Mueller |
| 2013/0268687 A1 | 10/2013 | Schrecker |
| 2013/0275308 A1 | 10/2013 | Paraskeva et al. |
| 2013/0311313 A1 | 11/2013 | Laracey |
| 2013/0339188 A1 | 12/2013 | Mohamed et al. |
| 2014/0006280 A1 | 1/2014 | Scipioni |
| 2014/0019358 A1 | 1/2014 | Priebatsch |
| 2014/0025581 A1 | 1/2014 | Calman |
| 2014/0025958 A1 | 1/2014 | Caiman et al. |
| 2014/0032419 A1* | 1/2014 | Anderson .......... G06Q 20/3672 705/78 |
| 2014/0040133 A1 | 2/2014 | Lee |
| 2014/0040148 A1 | 2/2014 | Ozvat et al. |
| 2014/0058951 A1 | 2/2014 | Kuppuswamy |
| 2014/0067677 A1 | 3/2014 | Ali |
| 2014/0074637 A1* | 3/2014 | Hammad .......... G06Q 20/325 705/21 |
| 2014/0074701 A1 | 3/2014 | Kingston |
| 2014/0081838 A1 | 3/2014 | Calman |
| 2014/0108263 A1 | 4/2014 | Ortiz et al. |
| 2014/0108785 A1 | 4/2014 | Lindteigen |
| 2014/0164243 A1 | 6/2014 | Aabye et al. |
| 2014/0278894 A1 | 9/2014 | Toumayan |
| 2014/0279552 A1 | 9/2014 | Ortiz et al. |
| 2014/0344153 A1 | 11/2014 | Raj |
| 2015/0012428 A1 | 1/2015 | Gray |
| 2015/0032627 A1 | 1/2015 | Dill et al. |
| 2015/0046330 A1 | 2/2015 | Hanafi |
| 2015/0052064 A1 | 2/2015 | Karpenko et al. |
| 2015/0058191 A1 | 2/2015 | Khan |
| 2015/0100495 A1 | 4/2015 | Salama |
| 2015/0112870 A1* | 4/2015 | Nagasundaram .... G06Q 20/385 705/67 |
| 2015/0112871 A1* | 4/2015 | Kumnick .......... G06Q 20/382 705/67 |
| 2015/0120472 A1 | 4/2015 | Aabye et al. |
| 2015/0186871 A1 | 7/2015 | Laracey |
| 2015/0213435 A1 | 7/2015 | Douglas et al. |
| 2015/0235212 A1 | 8/2015 | Ortiz |
| 2015/0254635 A1 | 9/2015 | Bondesen |
| 2015/0254643 A1 | 9/2015 | Bondesen |
| 2015/0254655 A1 | 9/2015 | Bondesen |
| 2015/0262170 A1 | 9/2015 | Bouda |
| 2015/0262180 A1 | 9/2015 | Hambleton |
| 2015/0332246 A1 | 11/2015 | Lafeer |
| 2015/0332264 A1 | 11/2015 | Bondesen |
| 2016/0019536 A1 | 1/2016 | Ortiz |
| 2016/0071094 A1 | 3/2016 | Krishnaiah |
| 2016/0073263 A1 | 3/2016 | Wolosewicz |
| 2016/0086166 A1 | 3/2016 | Pomeroy |
| 2016/0104155 A1 | 4/2016 | McGaugh |
| 2016/0189291 A1 | 6/2016 | Nair |
| 2016/0210626 A1 | 7/2016 | Ortiz |
| 2016/0224977 A1* | 8/2016 | Sabba .................. G06Q 20/385 |
| 2016/0358172 A1 | 12/2016 | Ziat |
| 2016/0371668 A1 | 12/2016 | Priebatsch |
| 2017/0017958 A1 | 1/2017 | Scott |
| 2017/0161733 A1 | 6/2017 | Koletsky |
| 2017/0249622 A1 | 8/2017 | Ortiz |
| 2017/0270524 A1 | 9/2017 | Kim |
| 2017/0323283 A1 | 11/2017 | Todasco |
| 2018/0137498 A1 | 5/2018 | Kim |
| 2018/0225660 A1 | 8/2018 | Chapman |
| 2019/0156326 A1 | 5/2019 | Todasco |

FOREIGN PATENT DOCUMENTS

| | | |
|---|---|---|
| CA | 2858203 | 6/2013 |
| CA | 2830260 | 4/2014 |
| CA | 2890335 | 5/2014 |
| CN | 101071490 A | 11/2007 |
| CN | 101226616 A | 7/2008 |
| CN | 103679443 A | 3/2014 |
| EP | 1843277 | 10/2007 |
| EP | 2048594 A1 | 4/2009 |
| EP | 2365469 A1 | 9/2011 |
| EP | 2145399 | 7/2012 |
| EP | 2587432 A1 | 5/2013 |
| WO | 2002048846 | 6/2002 |
| WO | 2007122224 A1 | 1/2007 |
| WO | 2009001020 | 12/2008 |
| WO | 2010015734 A1 | 2/2010 |
| WO | 2012021864 A2 | 2/2012 |
| WO | 2013003372 A1 | 1/2013 |
| WO | 2013072613 A1 | 5/2013 |
| WO | 2015025282 | 2/2015 |

OTHER PUBLICATIONS

P. De, K. Dey, V. Mankar and S. Mukherjea, "Towards an interoperable mobile wallet service," 2013 10th International Conference and Expo on Emerging Technologies for a Smarter World (CEWIT), 2013, pp. 1-6, doi: 10.1109/CEWIT.2013.6713767. (Year: 2013).*

Final Office Action dated Jul. 3, 2019 in U.S. Appl. No. 15/000,685.

Non-Final Office Action dated Jul. 11, 2019 in U.S. Appl. No. 15/453,193.

Non-Final Office Action dated Jul. 24, 2019 in U.S. Appl. No. 15/414,065.

Non-Final Office Action dated Sep. 18, 2019 in U.S. Appl. No. 14/879,913.

Final Office Action dated Sep. 18, 2019 in U.S. Appl. No. 15/201,428.

Extended European Search Report dated Sep. 20, 2019 in EP Application No. 17762362.6.

Chen et al.; NFC Mobile Transactions and Authentication based on GSM Network, Second Internation Workshop on Near Field Communication; pp. 83-89 IEE Computer Society.

Mantoro et al.; Online Payment Procedure Involving Mobile Phone Network Infrastructure and Devices; Dept of Computer Science, University Malaysia.

Tang et al.; A Mobile Identity Authentication Scheme of E-Commerce Based on Java-SIM Card, V2-114 to V2-118 School of Electronics Engineering, Beijing University.

USCIS Form I-9 "Instructions for Employment Eligibility Verification, 9 pages, Jan. 31, 2014, including p. 9 listing Lists of Acceptable Document" used to establish identity and employment authorization.

"First Time Applicants", Department of State, retrieved Feb. 12, 2015, 4 pages citing documents needed for applying for a passport.

White, Ron, How Computers Work, Oct. 15, 2003, Paul Boger, Illustrated by Timothy Edward Downs, 7th Edition (Year: 2003).

Non-Final Office Action dated Feb. 14, 2019 in U.S. Appl. No. 14/869,186.

Non-Final Office Action dated Feb. 5, 2019 in U.S. Appl. No. 15/201,428.

Extended European Search Report dated Feb. 14, 2019 in EP Application No. 16816879.7.

Non-Final Office Action dated Apr. 15, 2019 in U.S. Appl. No. 14/705,477.

International Search Report dated Oct. 12, 2017 in application No. PCT/CA2017/000173.

Written Opinion of International Search Authority dated Oct. 12, 2017 in application No. PCT/CA2017/000173.

(56) References Cited

OTHER PUBLICATIONS

Final Office Action dated Aug. 23, 2018 in U.S. Appl. No. 14/705,477.
Non-Final Office Action dated Oct. 18, 2018 in U.S. Appl. No. 15/000,685.
EESR dated May 7, 2018 in EP Application No. 15846067.5.
EESR dated Jan. 24, 2018 in EP Application No. 15848487.3.
EESR dated Jul. 3, 2018 in EP Application No. 16739695.1.
International Search Report dated Jul. 6, 2010 for Application No. PCT/AU2010/000546.
Office Action dated Aug. 6, 2014 in U.S. Appl. No. 14/287,134.
Office Action dated Oct. 22, 2015 in U.S. Appl. No. 14/287,134.
International Search Report and Written Opinion dated Jan. 19, 2016 in Application No. PCT/CA2015/000532.
International Preliminary Report on Patentability dated Apr. 11, 2017 in Application No. PCT/CA2015/000532.
International Search Report and Written Opinion dated May 2, 2016 in Application No. PCT/CA2016/000014.
International Preliminary Report on Patentability dated Jul. 25, 2017 in Application No. PCT/CA2016/000014.
International Search Report and Written Opinion dated Jan. 7, 2016 in Application No. PCT/CA2015/000519.
International Preliminary Report on Patentability dated Apr. 4, 2017 in Application No. PCT/CA2015/000519.
International Search Report and Written Opinion dated Oct. 14, 2016 in Application No. PCT/CA2016/000186.
International Preliminary Report on Patentability dated Jan. 2, 2018 in Application No. PCT/CA2016/000186.
International Search Report and Written Opinion dated Apr. 27, 2018 in Application No. PCT/CA2018/000017.
Office Action dated Feb. 5, 2018 in U.S. Appl. No. 14/705,477.
Office Action dated Aug. 27, 2014 in U.S. Appl. No. 14/056,440.
Office Action dated Aug. 3, 2016 in U.S. Appl. No. 14/142,072.
Office Action dated Oct. 15, 2014 in U.S. Appl. No. 14/287,134.
Office Action dated Feb. 19, 2015 in U.S. Appl. No. 14/287,134.
International Search Report and Written Opinion dated Jun. 23, 2017 in Application No. PCT/CA2017/000050.
Final Office Action dated Nov. 18, 2019 in U.S. Appl. No. 14/705,477.
Non-Final Office Action dated Nov. 12, 2019 in U.S. Appl. No. 15/884,847.
Non-Final Office Action dated Dec. 6, 2019 in U.S. Appl. No. 15/648,942.
Final Office Action dated Dec. 26, 2019 in U.S. Appl. No. 14/869,186.
Final Office Action dated Jan. 24, 2020 in U.S. Appl. No. 15/453,193.
Non-Final Office Action dated Jan. 29, 2020 in U.S. Appl. No. 15/201,428.
Non-Final Office Action dated Feb. 3, 2020 in U.S. Appl. No. 16/007,955.
Examination Report dated Feb. 11, 2020 in EP 15848487.3.
Notice of Allowance dated Mar. 12, 2020 in U.S. Appl. No. 15/414,065.
Office Action dated Mar. 26, 2020 issued in CN 201580064986.1.
Office Action dated Mar. 26, 2020 issued in CN 201580067059.5.
Office Action dated Mar. 12, 2020 issued in CN 201680016674.8.
Office Action dated Jun. 3, 2020 issued in U.S. Appl. No. 14/869,186.
Office Action dated Jun. 10, 2020 issued in U.S. Appl. No. 15/000,685.
Knott, What is Private Key Encryption, Koolspan, Mar. 6, 2014 retrieved from https://web.archive.org/web/20140306101755/http://www.koolspan.com/blog/private-key-encryption/ (Year:2014).
Examination Report dated May 19, 2020 issued in EP 15846067.5.
Notice of Allowance dated Mar. 24, 2021 issued in U.S. Appl. No. 15/000,685.
Notice of Allowance dated Mar. 25, 2021 issued in U.S. Appl. No. 15/201,428.
Notice of Allowance dated Mar. 30, 2021 issued in CA 2830260.
Office Action dated Jan. 13, 2021 issued in U.S. Appl. No. 14/869,186.
Office Action dated Jan. 26, 2021 issued in EP 16739695.1.
Office Action dated Jan. 26, 2021 issued in U.S. Appl. No. 15/453,193.
Office Action dated Jul. 13, 2020 issued in U.S. Appl. No. 16/007,955.
Office Action dated Jul. 2, 2020 issued in U.S. Appl. No. 15/201,428.
Notice of Allowance dated Jun. 23, 2020 issued in U.S. Appl. No. 14/705,477.
Office Action dated Jul. 6, 2020 issued in EP 17762362.6.
Office Action dated Jul. 6, 2020 issued in U.S. Appl. No. 15/884,847.
Office Action dated Jun. 24, 2020 issued in U.S. Appl. No. 14/879,913.
Office Action dated Oct. 8, 2020 issued in U.S. Appl. No. 15/453,193.
Verified by Visa Acquirer and Merchant Implementation Guide U.S. Region, May 2011, Visa, 114 pages (Year: 2011).
Visa 3-D Secure vs. MasterCard SPA, Gpayments Pty Ltd, Mar. 1, 2002, 37 pages (Year: 2002).
Office Action dated May 19, 2020 issued in AU 2015330644.
Office Action dated Jun. 3, 2020 issued in AU 2015327722.
Office Action dated Nov. 25, 2020 issued in CN 201680016674.8.
Office Action dated Nov. 16, 2020 issued in AU 2016208989.
Office Action dated Nov. 30, 2020 issued in CN 201580067059.5.
Office Action dated Dec. 3, 2020 issued in CN201580064986.1.
Office Action dated May 25, 2021 issued in U.S. Appl. No. 14/879,913.
Office Action dated Apr. 14, 2021 issued in CN 201580067059.5.
Office Action dated Apr. 21, 2021 issued in U.S. Appl. No. 15/884,847.
Gao, J. et al., "A 2D Barcode-Based Mobile Payment System," 2009 Third International Conference on Multimedia and Ubiquitous Engineering, 2009, pp. 320-329, doi: 10.
Office Action dated May 25, 2021 issued in U.S. Appl. No. 16/007,955.
Office Action dated May 18, 2021 issued in AU 2015330644.
Office Action dated Jun. 9, 2021 issued in EP 15848487.3.
Office Action dated Apr. 12, 2021 issued in AU 2016287789.
Office Action dated Apr. 16, 2021 issued in AU 2015330644.
Office Action dated Apr. 30, 2021 issued in AU 2015327722.
Office Action dated May 4, 2021 issued in EP 16816879.7.
Notice of Allowance dated May 8, 2021 issued in CN 201680016674.8.
Office Action dated Apr. 13, 2021 issued in CN 201580064986.1.
Notice of Allowance dated Feb. 7, 2022 issued in U.S. Appl. No. 16/007,955.
Balan, R.K. et al., "The Digital Wallet: Opportunities and Prototypes", in Computer, vol. 42, No. 4, pp. 100-102, Apr. 2009, doi: 10.1109/MC.2009.134 (Year: 2009).
Office Action dated Jan. 20, 2022 issued in AU 2017231106.
Summons to Oral Proceedings dated Jul. 1, 2021 issued in EP 17762362.6.
Office Action dated Jun. 30, 2021 issued in CN 201780028338.X.
Notice of Allowance dated Aug. 19, 2021 issued in U.S. Appl. No. 15/453,193.
Summons to Oral Proceedings dated Dec. 14, 2021 issued in EP 15846067.5.
Office Action dated Oct. 13, 2021 issued in U.S. Appl. No. 15/884,847.
Office Action dated Oct. 25, 2021 issued in CA 2963287.
Office Action dated Octobers, 2021 issued in CA 2961916.
Office Action dated Nov. 26, 2021 issued in U.S. Appl. No. 14/879,913.
Office Action dated Nov. 29, 2021 issued in CN 201580067059.5.
Office Action dated Dec. 27, 2021 issued in U.S. Appl. No. 14/869,186.
Notice of Allowance dated Nov. 15, 2021 issued in AU 2016208989.
Office Action dated Mar. 21, 2022 issued in U.S. Appl. No. 15/884,847.
Office Action dated Mar. 4, 2022 issued in U.S. Appl. No. 15/648,942.
Office Action dated Mar. 1, 2022 issued in CA 2974151.
Office Action dated Mar. 30, 2022 issued in U.S. Appl. No. 14/879,913.
Office Action dated Mar. 2, 2022 issued in CN 201780028338.X.
Office Action dated Jun. 2, 2022 issued in U.S. Appl. No. 14/869,186.
Office Action dated Jun. 13, 2022 issued in U.S. Appl. No. 17/352,174.
Office Action dated Jul. 26, 2022 issued in AU 2021203226.
Office Action dated Aug. 2, 2022 issued in EP 16739695.1.
Office Action dated Aug. 2, 2022 issued in AU 2021203623.
Office Action dated Jul. 14, 2022 issued in CA 2961916.
Office Action dated Sep. 2, 2022 issued in CA 3126471.
Office Action dated Sep. 14, 2022 issued in CA 2963287.
Office Action dated Sep. 21, 2022 issued in U.S. Appl. No. 14/869,186.
Office Action dated Sep. 30, 2022 issued in U.S. Appl. No. 14/879,913.

(56) References Cited

OTHER PUBLICATIONS

Office Action dated Sep. 2, 2022 issued in CN 201780028338.X.
European Extended Search Report dated Oct. 21, 2022 issued in EP 22173329.8.
Notice of acceptance dated Dec. 22, 2023 issued in AU 2017231106.
European Extended Search Report dated Jan. 19, 2023 issued in EP 22187813.5.
Office Action dated Oct. 27, 2022 issued in CA 2991073.
Office Action dated Nov. 8, 2022 issued in U.S. Appl. No. 15/884,847.
Notice of allowance dated Dec. 29, 2022 issued in U.S. Appl. No. 17/080,197.
Lampropoulos et al. "Identity Management Directions in Future Internet", IEEE Communications Magazine, Dec. 2011, pp. 74-83 (Year: 2011).
Office Action dated Dec. 15, 2022 issued in U.S. Appl. No. 17/352,174.

\* cited by examiner

PROCESSING OF ELECTRONIC TRANSACTIONS

CROSS-REFERENCE TO RELATED APPLICATIONS

This application claims all right and benefit, including priority, of U.S. Provisional Patent Application No. 62/361,919, filed 13 Jul. 2016 and entitled "SECURE PROCESSING OF ELECTRONIC PAYMENTS;" and is a continuation-in-part of, co-owned U.S. patent application Ser. No. 15/000,685, filed 19 Jan. 2016 and entitled "SECURE PROCESSING OF ELECTRONIC PAYMENTS;" and Ser. No. 15/201,428, filed 2 Jul. 2016 and entitled "SECURE PROCESSING OF ELECTRONIC PAYMENTS," and claims all right and benefit thereof, including rights of priority of U.S. Provisional Patent Application No. 62/188,067, filed Jul. 2, 2015, and entitled "SECURE PROCESSING OF ELECTRONIC PAYMENTS"; U.S. Provisional Application No. 62/200,859, filed Aug. 4, 2015, and entitled "SECURE PROCESSING OF ELECTRONIC PAYMENTS". The entire contents of each of the foregoing are incorporated herein by this reference.

DISCLAIMER

Aspects of the material disclosed in this application relate to the creation, administration, manipulation, processing, and storage of data useful in processing of payment transactions. Aspects of such creation, administration, manipulation, processing, and storage may be subject to regulation by governmental and other agencies. The disclosure herein is made solely in terms of the use of logical and physical components, functions, and combinations in signal processing systems and communications systems, in order open new economic and communications possibilities, without regard to statutory, regulatory, or other legal considerations. Nothing herein is intended as a statement or representation that any of the systems, components, or processes proposed or discussed herein, or the application thereof, does or does not comply with any statute, law, regulation, or other legal requirement in any jurisdiction.

TECHNICAL FIELD

The present disclosure relates generally to the generation and secure and efficient execution of electronic signal exchanges, and more particularly to improved systems, methods, and programming structures for the secure negotiation, authorization, execution, and confirmation of multi-party and multi-device transactional data processes.

BACKGROUND

Electronic signal exchanges such as those representing payments and other transactions are a type of electronic signal exchange that have provided significant benefits to human kind, including improved efficiency in the distribution and production of goods and services. In addition to numerous benefits, however, such transactions are associated with both numerous risks and intense pressures from users of such systems for speed, security, reliability, and convenience. Although many different systems, devices, and processes useful in negotiating and executing such transactions have been proposed, there remains significant room for improvement.

In many cases, for example, users of desktop computers, smart phones and other mobile digital assistants, and other network communication devices encounter difficulties in safely, efficiently, reliably, and conveniently effecting purchase transactions with merchants by means of browser-based, point-of-sale (POS), m-commerce, and other forms of e-commerce systems, particularly where such users have access, or are entitled to have access, to multiple sources of funds to be applied in payment for such transaction. For example, a given merchant might not easily and reliably support payments through the use of accounts administered by one or another bank, and vice versa; difficulties are encountered by networked merchant resources in setting up and enabling access to rewards, loyalties, and other forms of marketing processes; and banks and other financial institutions are hampered in, or unable to, pass along efficiencies in data and signal management and administration to purchasers, merchants, and other parties involved in electronic transaction.

In addition, merchants and other providers of goods and services, including for example governmental and not-for-profit organizations, seldom have rapid, efficient, and reliable means for having input to transactional flow, when banks or other financial institutions control access to bank accounts and other sources of payment funding.

In general, rapid, reliable, and efficient communication between financial institutions and merchants have not always been available.

SUMMARY OF INVENTION

In various aspects and embodiments the disclosure herein provides systems, devices, methods, and machine-executable programming structures stored in persistent (i.e., non-transitory), computer-readable media for the secure execution of electronic signal exchanges, and more particularly improved systems, methods, and programming structures for the rapid and secure negotiation, authorization, execution, and confirmation of multi-party data processes, including payment transactions conducted between purchasers having electronic access to bank accounts and other sources of payment, merchants operating e- and/or m-commerce transaction options, and banks and other financial institutions capable of electronically communicating with both. In various embodiments, the disclosure provides systems, methods, and programming structures which are particularly well suited for the negotiation, authorization, execution, and confirmation of such purchases, and other electronic resource (including funds) transfers.

For example, in one aspect the disclosure provides networked payment authorization management systems, and related processes and logical programming structures. A system according to such aspect of the invention can comprise one or more network communication systems, one or data processors, and one or more persistent memory devices. The persistent memory device(s) comprise stored, machine-interpretable instructions adapted to cause the data processor(s) to receive from purchaser communication devices, using the network communication systems, requests for generation of select merchant payment tokens. In response to the requests, and subject to any applicable legal, regulatory, and/or business constraints, the payment authorization management systems can generate the select merchant payment tokens, and store them in secure memory, along with identifiers associated with one or more transaction funding sources, such as credit, debit, and rewards accounts associated with requesting purchasers. In addition, the select merchant payment tokens can be stored in association with special transactional requests submitted by the select merchants, such as requests for application of discounts, modified loyalty or rewards program rules, rebates, etc. In some embodiments, such special merchant transaction requests can be updated at any time, at the request of the select merchant(s).

In another aspect, the disclosure provides networked merchant transaction management systems, and related processes and logical programming structures. A system according to such aspect of the invention can comprise one or more network communication systems, one or data processors, and one or more persistent memory devices. The persistent memory device(s) comprise stored, machine-interpretable instructions adapted to cause the data processor(s) to receive from purchaser communication devices, using the one or more network communication systems, select merchant payment token authorization requests, such requests comprising secure purchaser identifiers and select merchant payment token generated by payment authorization management systems associated with the purchasers. The systems can communicate with the payment authorization management systems in order to confirm the validity of the tokens and any associated conditions, restrictions, or rules, including any special transactional requests provide by the merchant transaction management systems.

In a further aspect, the invention provides purchaser communication devices, and related processes and logical programming structures. A device according to such aspect of the invention can comprise one or more network and/or short-range data communication systems, one or more data processors, one or more of any of a wide variety of input, output, and/or input-output devices, and one or more persistent memory device comprising stored, machine-interpretable instruction sets. Such machine-interpretable instruction sets can multiple distinct application programs, i.e., logical structures adapted to enable the data processor(s) to execute separately-controllable processes according to distinct security and logical specifications. For example, such application programs can include internet and other web browsers, and specialized payment management applications (e.g. virtual wallets) associated with banks or other financial institutions, and with merchant e- and/or m-commerce platforms. By enabling users of such purchaser devices to operate such payment management applications and merchant applications separately, but in cooperative fashion as taught herein, the invention enables purchasers to set up payment and other preferences with both the FIs that administer their payment accounts and the merchants from whom they wish to acquire goods and/or services, while allowing both the FIs and merchants to maintain their distinct security and legal obligations while operating according to their own preferred commercial standards. Such merchant and FI applications enable merchants and FIs to communicate with purchasers in ways that are efficient and convenient for the purchasers, while allowing the merchants and FIs to maintain their own security and commercial standards, through the use of controlled encryption, secure memory storage and access, etc.

In all cases, select merchant tokens generated and otherwise processed in accordance with the disclosure can be used to complete electronic transactions in accordance with any special requests generated by purchasers and/or merchants, using accounts identified by purchasers as sources of payments, rapidly, securely, and efficiently.

Thus, the use of systems, devices, and methods in accordance with the disclosure offers a number of advantages, including more convenient or less burdensome user interfaces, particularly with respect to the ability to draw on multiple sources of transaction funds and/or other payment sources, which can be held, administered and/or otherwise controlled by single or multiple financial institutions and/or other financial services providers, and increased ability on the part of purchasers, merchants, and FIs to complete transactions, which in some circumstances may be critical to their physical and/or economic health or well-being. In addition, various aspects and embodiments of the invention enable more flexible and efficient interactions between purchasers, merchants, and account administration systems such as servers controlled by banks, credit unions, and other financial institutions (FIs).

Many further advantages will be apparent to those skilled in the relevant arts from the disclosure herein.

Those skilled in the relevant arts will appreciate, once they have been made familiar with this disclosure, that the use of the invention in conjunction with other improvements provided by the applicant opens a very wide variety of further capabilities and advantages. For example, applicant's trusted platform, universal wallet, split pay, and real-time credit systems and processes, as described in co-owned U.S. patent application Ser. Nos. 15/000,685 and 15/201,428, (each of which has been incorporated herein by reference) can be leveraged efficiently, with advantageous results.

BRIEF DESCRIPTION OF THE DRAWINGS

Reference will be made herein to the accompanying drawings, in which.

For clarity and ease of description, like reference numerals are be used in the drawings to describe the same or like parts.

DETAILED DESCRIPTION

Figure 1:
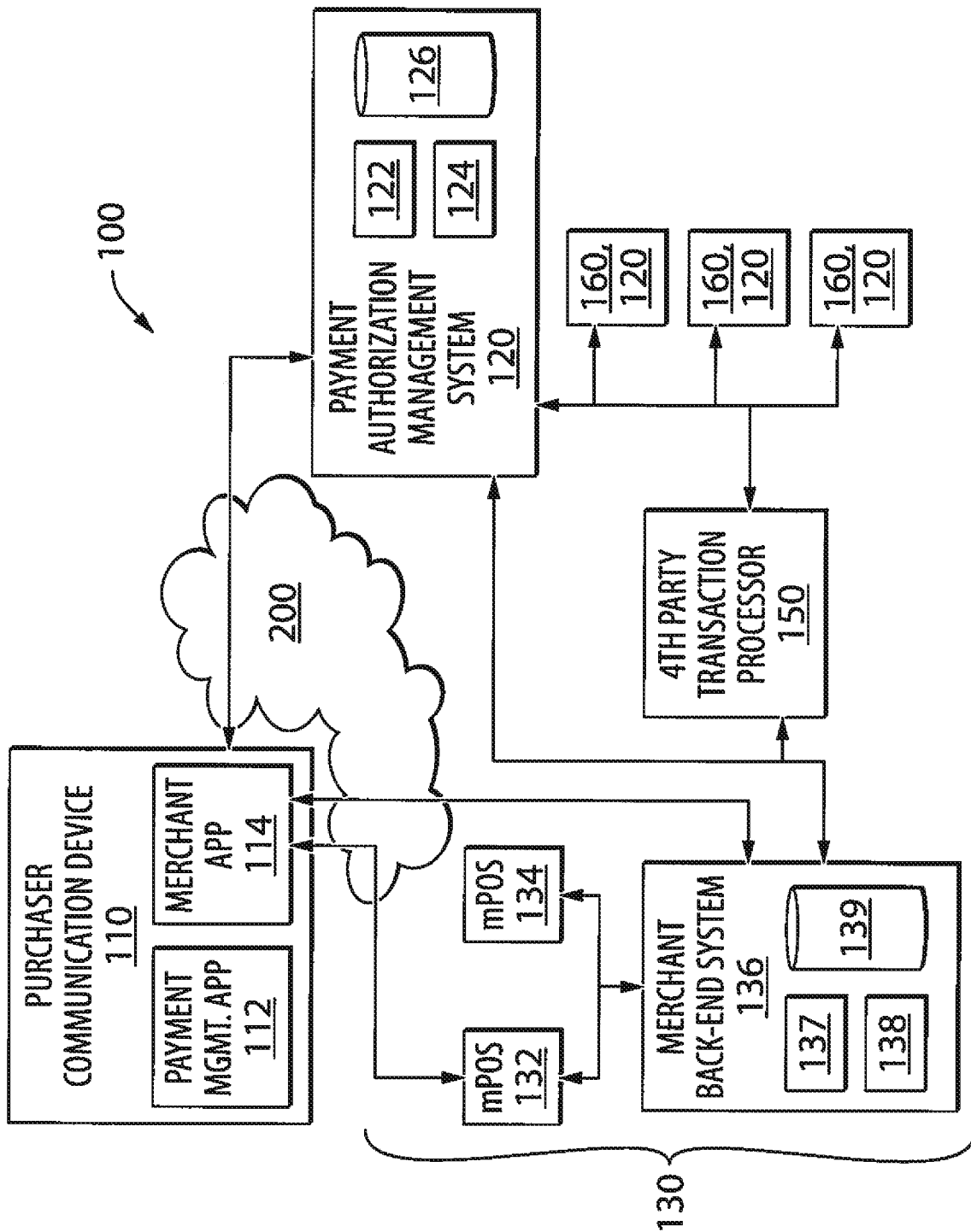
FIG. 1 is a schematic block diagram of an example system suitable for use in processing data in accordance with aspects of the disclosure.

Reference is initially made to FIG. 1, which shows a schematic diagram of a system 100 suitable for use in implementing various aspects and embodiments of the invention. In the example shown, a system 100 includes one or more purchaser or other user request communication devices 110 (also a "network transaction communication device" and/or a "network communication device"), for use by purchasers or other users 190 (FIGS. 3, 4); one or more payment authorization management systems 120; one or more merchant transaction management systems 130, each of which can comprise, for example, one or more merchant point of sale (POS) and/or other transaction device(s) 132, 134, and merchant or other financial service provider (FSP) server(s) 136; one or more optional $4^{th}$ party transaction processors 150; and optional further FI system(s) 160, as described below. System(s) 100 may also include, or be adapted to communicate with or by means of, one or more communications networks 200 such as the internet, public or private wireline networks such as the PSTN, etc.

While only one of each of devices 110, 120, 130, 132, 134, 136, 150, 200 is shown in FIG. 1, those skilled in the relevant arts will readily understand that a system 100 can include any desired, required, or otherwise advantageous numbers of such devices.

Payment authorization management system(s) and other FSP, FI, or transaction processing system(s) or platform(s) 120, 136, 150, 160 may comprise or consist of any suitably-configured enterprise, server, desktop, laptop, or other suitably-configured types or class(es) of electronic data processing (computer) systems. A large number and variety of suitable devices are now available commercially, and doubtless others will be developed subsequent to the preparation of this specification. Further details of platform(s) 120, 150, 160 are provided below. As will be understood by those skilled in the relevant arts, once they have been made familiar with this disclosure, such systems can include any one or more of a wide variety of data/signal processing units 122 and memories 126, in order for example to securely, reliably, rapidly, and efficiently store, access, and read stored data representing account information for any desired numbers of account users, as well machine-readable instructions representing logical structures to be applied in authorizing, evaluating, adjudicating, and otherwise process requests relating to purchases and other transactions. Such components can include one or more of each of processor(s) 122, network and other data communications systems 124, and memories 126, which can include any persistent and secure memory(ies) suitable for use in implementing the various systems, devices and processes disclosed herein.

Merchant transaction management system(s) 130 and device(s) 132, 134, 136 may comprise or consist of any suitably-configured POS, mPOS, and backend data processing devices, including special-purpose devices including, card, chip, short-range wireless, and other devices, servers, etc. as well as server-class general-purpose systems such as those described above in connection with payment authorization management system(s) 120. As will be understood by those skilled in the relevant arts, once they have been made familiar with this disclosure, such systems can include any one or more of a wide variety of data/signal processing units and memories, in order for example to securely, reliably, rapidly, and efficiently store, access, and read stored data representing account information for any desired numbers of account users, as well machine-readable instructions representing logical structures to be applied in authorizing, evaluating, adjudicating, and otherwise process requests relating to purchases and other transactions. Such components can include one or more of each of processor(s) 137, network and other data communications systems 138, and memories 139, which can include any persistent and secure memory(ies) suitable for use in implementing the various systems, devices and processes disclosed herein. Further details of merchant system(s) 130 and device(s) 132, 134, 136 are provided below.

Any of devices 110, 120, 130, 132, 134, 136, 150, 160 may communicate with each other by wireless (including radio, wireless telephone, optical, RFID, and infrared), wireline, or other means, using for example suitably-configured signal processors, transmitters, and receivers configured to communicate via the internet, the PSTN, and/or other communications networks 200, using any suitable protocols or combinations of protocols. Very commonly, such devices incorporate one or more dedicated communication subsystems, operating under the control of one or more central processing units (CPUs) and/or other processors, for such purposes.

Figure 2:
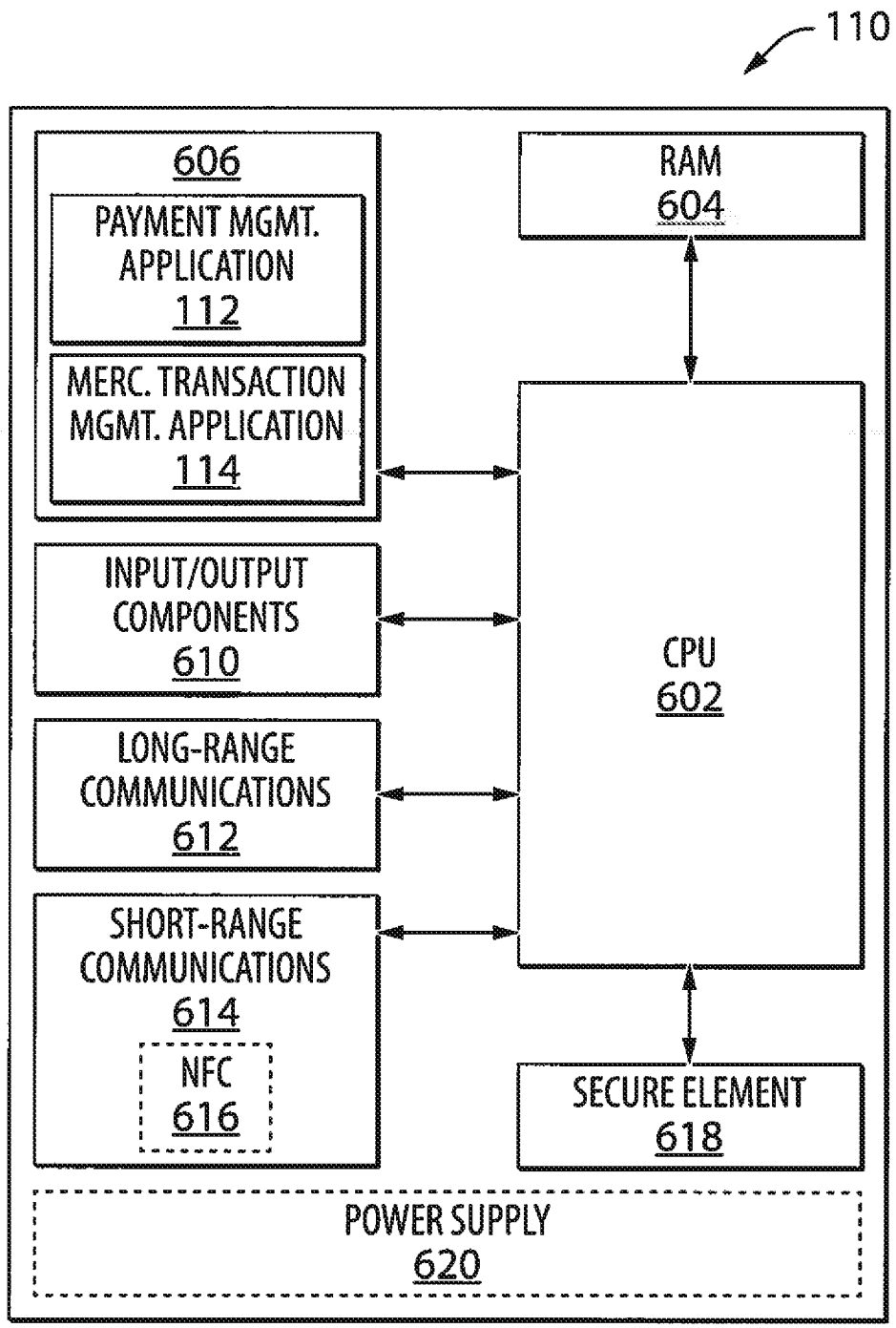
FIG. 2 is a schematic block diagram of an example signal communication device suitable for use in processing data in accordance with aspects of the disclosure.

Referring now to FIG. 2, there is shown a schematic representation of a purchaser communication device 110, in the form of a mobile communication device such as a smart phone, tablet, or other PDA. As previously noted, a device 110 may generally be any portable, desktop, or other electronic signal/data processing and communication device comprising an assembly of electronic, structural and/or electro-mechanical components within a suitable housing, and which in some embodiments provides a user with various voice and/or data functions including short and/or long-range network connectivity. As will be understood, terms such as "portable" or "mobile", when used herein, can indicate that device 110 may generally be transported between different physical locations by a user without resort to physical aids. In particular, in various embodiments mobile embodiments of devices 110 can include devices that may be carried on a user's person or clothing, such as cellular or other radio telephones, personal data assistants (PDA), tablets, notepads, portable computers, smart watches or jewelry, and the like. However, various aspects and embodiments of the invention may be implemented using non-mobile communication devices 110 such as laptop or personal computers.

In any such embodiments, purchaser communication device(s) 110, 600 may include one or more data processors (CPUs) 602, random access or other forms of persistent, typically re-writable memory(ies) 604, 606 any of which may store non-transient either or both of data and machine interpretable instruction sets representing logical structures in the form of device applications, or other programs or routines. In general, CPU(s) 602 can include any microprocessor(s) or other general or special purpose processing unit(s) configured to control the overall operation of device(s) 110 and their various components, with which CPU(s) 602 may be connected by a bus(es) or other electronic link(s) or path(s) adapted for transferring data or other signals, power, etc., on the device 110. Read and write operations of CPU(s) 602 may be facilitated by memory(ies) 604, 606 or other integrated circuit(s) or volatile memory storage associated with or integrated within CPU(s) 602 or to which CPU(s) 602 have access.

Memory(ies) 604, 606 may include one or more persistent (i.e., non-transitory) memory stores, such as flash memory or read-only memory (ROM), which are either physically embedded within the device(s) 110 or which may alternatively be removably loaded or inserted into device(s) 110 by a user, such as on a subscriber identity module (SIM) card or secure digital (SD) memory card. Memory(ies) 606 may be used to store any type of data and/or executable machine instruction files, such as but not limited to media files (music and photos), as well as software used to implement operating systems (OSs) 608 and other programs, routines, or applications, as described herein. Memory(ies) 606 may also be used to store one or more files used by CPU 602 or mobile OS 608 to execute different functions or control different components on mobile device 110, 600, such as contact information, network preferences, application data, and other files.

Purchaser communication device(s) 110 may further be equipped with one or more of any of a very wide variety of input and/or output components 610, in order to enable user to interactions with the device(s) 110. Such components, which are generally denoted herein as 610, may provide both for the user to input data or commands into device 110, as well as to perceive or otherwise access data or information output by the device 110. Without limitation, different possible input components 610 can include touch pads, dials, click wheels, touchscreens and other displays, keyboards, keypads, and other buttons and switches, as well as cameras, microphones, and biometric sensors (e.g., fingerprint scanners). Example output components 610 can include speakers, screens and visual displays, rumble packs, and combinations thereof. Other I/O components 610 not specifically mentioned herein may also be included in different embodiments.

Device(s) 110 can further include data communications systems, including for example long-range or network communications components 612 and/or short-range network communications components 614 to enable the device(s) 110 to employ a variety of voice, data, and other signal communication functions. As will be appreciated, the terms "long-range" and "short-range" may be used herein to denote relative distances and are not intended to denote any specific limitations or ranges. Thus, long-data communications systems 612, 614 allow device(s) 110 to communicate with other proximately or remotely located targets, which can be other similarly or differently configured devices 110, servers 120, 130, 150, 160, systems 100, and other network-enabled devices.

For example, long-range or network communications component(s) 612 may be used by a device 110 to communicate with other components of system(s) 100 via cellular or other distributed networks 200 using suitable voice and/or data communications protocols, such as but not limited to Time Division Multiple Access (TDMA), Code Division Multiple Access (CDMA), Global System for Mobile Communication (GSM), Wireless Application Protocol (WAR), and others. Using such protocols a device 110 can route communications to arbitrarily remote devices of various types, including voice, data, and text-based messages without limitation. To enable long-range communications, various hardware and/or software components may be included in system(s) 612, such as an antennae, transmitters, receivers, and digital signal processors. Specific configuration(s) of long-range communications systems 612 can depend generally upon the communication protocol(s) that are implemented and the purposes to which a device 110 is to be put.

Short-range or near-field communications component(s) 614 can enable communication between mobile or other device(s) 110 and other relatively proximately located devices, servers, or systems. For example, short-range communications 614 may include one or more short-range transceivers, such as for connection to Wi-Fi (802.11 standard) or Bluetooth networks, as well as other modes of short-range communication, like RFID, infrared or optical. In some embodiments, short-range communications 614 may in particular include a near field communications (NFC) subsystem 616 that may be utilized to communicate with an NFC reader, among various different purposes or functions, so as to initiate contactless mobile payments with merchant POS terminals 134 as described further below.

In various embodiments devices 110 further include secure elements 618 configured as tamper-resistant, limited-access storage environments for sensitive data and other information, such as payment credentials or cryptographic keys, data and programming structures. For example, secure element(s) 618 may include or operate under the separate and secure control of any or all of suitably-configured integrated circuit(s) (IC(s)), an operating system(s) (OS(s)), or program(s), including payment management (or "virtual wallet") application(s) 112, merchant transaction management application(s) 114, host card emulation (HCE) applications and the like. Secure element(s) 618 may be either embedded (integrated) physically within a mobile device 110 or, alternatively, provided on a card such as a SIM or SD card that is insertable into the device 110. CPU(s) 602, applications 112, 114, and NFC subsystem(s) 616 may in various embodiments have access to the contents of secure element 616.

Device(s) 110 can further include power supply(ies) 620 configured with any components or circuitry that are suitable for generating, receiving or transmitting power to CPU 602 and other components of a device 110. For example, a power supply 620 may include circuitry for processing power received from an external power source, such as an electrical utility or grid, when a device 110 is plugged into or otherwise connected to such external power source. In some cases, power supply 620 may further include one or more batteries, such as nickel metal hydride, nickel cadmium, and lithium-ion batteries, which may provide a source of power when device 110 is not able to connect to an external power source. Other power generating or processing circuitry, such as solar panels or inductive coils, may also be included so that power supply 620 may deliver energy to different components within a device 110. It should be noted that individual connections between power supply 620 and other components within device 110 are not shown in FIG. 6 and instead power supply 620 is indicated for convenience only as an isolated element.

As previously mentioned, in many embodiments purchaser and other request communication device(s) 110 are not "mobile" device(s). Thus, for example, a purchaser device 110 may have a size, shape and/or weight that make it difficult, inconvenient, or otherwise impractical for a user to transport over more than trivial distances without some physical assistance or assistance, or for routine portable use. In particular, a non-mobile user device 110 may be one that a user cannot practically carry on their person or clothing. Examples of a non-mobile device 110 include a user's desktop computer and other normally stationary devices.

Non-mobile embodiments of device(s) 110 according to the invention may or may not differ, in terms of communications ability, secure memory, etc., from mobile embodiments. In some cases, for example, a non-mobile embodiment of a device 110 may lack a secure element 618 because such device 110 is not configured to receive a SIM or SD card. In others cases, at least one of long-range communications 612 and short-range communications 614 may differ between mobile and non-mobile embodiments. For example, instead of long-range communications system(s) 612 configured for wireless communication over distance, a purchaser device 110 can include one or more modems or other network components for connecting to a distributed network 200, such as the Internet, in place of a cellular antenna. In some cases, short-range communications 614 may not include an NFC receiver 616, but may include WI-FI and/or Bluetooth antennae or others. Embodiments of the systems and processes described herein may utilize either a mobile device 600 or a non-mobile device without limitation.

As further shown in FIG. 2 and described below, a mobile or other device 110 can in accordance with various aspects and embodiments of the invention be configured to initiate and otherwise control mobile payments and other electronic transactions from within either or both of payment management or "virtual wallet" application(s) 112 associated with one or more banks or other FIs responsible for administration of monetary and alternative value (e.g., loyalty or rewards) accounts and merchant transaction management application(s) or program(s) 114 provided by or otherwise associated with a merchant or merchant system 130 or, as described further below, from non-dedicated application(s) or program(s), such as one or more web browsers or merchant transaction e-commerce websites administered by, for example, a merchant transaction management system 136.

As will be understood by those skilled in the relevant arts, and as will be explained more fully below, an "application," or application program, is a set of computer-interpretable instructions adapted to be executed by one or more processors 602, 137, 122 of device 110, 120, 130, etc., in accordance with logical structures directed toward a common task or purpose, such as the management of one or more banking or other financial or value accounts (e.g., application 112), for interaction with a specific merchant e- or m-commerce program (application 114), etc. Instructions associated with such applications can be stored together in single memory(ies) 606, 604, 126, 139, etc., or can be stored in multiple memories served by or otherwise accessible to devices 110, 120, 130, using distributed programming techniques.

Accordingly, one or more different merchant and payment management transaction communication applications 112, 114 or other programs may be installed by a user of a device 110 into mobile or other device memories 606, 604, for execution by a CPU 602 under the higher-level control of an operating system (OS) not shown. Only one such merchant application 114 and one payment management application (such as a virtual wallet) each are shown in FIG. 2 for convenience, but any number may be installed in different embodiments according to the user's preferences.

Among other possible functions, a virtual wallet or other payment management application 112 can comprise data representing machine-executable instruction sets representing rules or other logical structures to be applied by one or more processor(s) 602 of a device 110 and configured to enable a user of the device to interact with account and/or transaction management and control programs implemented or otherwise controlled by one or more payment authorization management systems 120 and adapted to enable secure access to operating systems and other programs that will enable an authorized user of a device 110 to access and control information pertaining one or more monetary or other value accounts, so as to control deposits, withdrawals, change of name, address, and other information, etc. As will be understood by those skilled in the relevant arts, such applications 112 may reside wholly on a device 110 and be configured for secure communication with account access and control programs implemented on such systems 120, in accordance with logical structures residing in memory on the user device 110; or such applications 112 can be configured for distributed implementation by, for example, providing a front end/user interface application on the user's device 110, with control and management processing taking place in accordance with logical structures associated with the application residing on the FI system 120.

A merchant application 114 can comprise data representing machine-executable instruction sets representing rules or other logical structures to be applied by one or more processor(s) 602 of a device 110 and configured to enable a user of the device to purchase a product or service that a merchant 130 displays or advertises to the user from within the merchant application 114, or to navigate to a website or other e- or m-commerce site associated with the merchant and browse services, products, etc., and set up and execute purchase or other transactions. Different possible merchant applications 114 can include those which are dedicated to a specific merchant's goods and/or services, as well as third party applications, such as auction sites or merchant group affiliations, which offer goods and/or services on behalf of multiple merchants. Applications 114 can reside wholly on a user's device 110 and be configured for secure communication with transaction control programs implemented on merchant transaction management systems 130, in accordance with logical structures residing in memory on the user device 110; or such applications 114 can be configured for distributed implementation by, for example, providing a front end/user interface application on the user's device 110, with transaction control processing taking place in accordance with logical structures associated with the application residing on the merchant system 130.

In some embodiments, as described further below, a merchant transaction management application 114 may be configured so that payment credentials or other information stored within one or more wallet applications 112 may be pulled, or otherwise accessed, by the merchant application 114 from or through a virtual wallet application 112 or (other) secure memory source without need for a user of a device 110 to open or launch any separate wallet or other payment management application 112. For example, when a payment transaction is initiated by a user via a merchant application 114 the user may be presented with a screen or prompt providing the user with a choice which payment credential stored in any of one or more wallet applications 112 to pull for use in executing the transaction. Alternatively, merchant application 114, 630 may automatically pull a default or pre-selected payment credential from wallet application 112, 622 without prompting the user.

The provision of separate merchant transaction management application(s) 114 and FI-related payment management application(s) 112 on a purchaser device 110 can enable a purchaser or other user to interact with merchant system(s) 130 and FI(s) 120 separately, using logical structures generated by the respective merchants and FIs and thereby ensuring that communications involved in such interactions are conducted according to distinct security, legal, and commercial standards required or otherwise imposed by the merchants and FIs.

By enabling cooperative use of such applications 112, 114 as disclosed herein, the invention opens up significant new transactional possibilities, without sacrificing security or commercial advantage or necessity.

In the same and further embodiments, memory(ies) 604, 608 of a device 110 can further incorporate or otherwise support non-merchant specific applications or programs, such as games, general purpose web browsers, readers, and the like from which it may be possible to initiate electronic transactions by, for example accessing a merchant website over the internet, via pop-up (graphical) user interfaces (GUIs,) etc. Such non-merchant applications may be coupled to one or more mobile wallet applications 112 in order to retrieve payment tokens or other credentials that may be stored therein, or otherwise cooperate with such wallet applications; and, via CPU 602, to a network communication component such as short-range communications 614 or long-range communication 612 or to any other network component, such as a modem installed in a non-mobile user device 110, 110', and thereby any one or more merchant transaction management system(s) 130.

For example, in such cases a user may, to initiate an electronic transaction, navigate to a web page or website using, e.g., any available I/O devices as described herein. After the user has generated a suitably-configured transaction request data set (or 'requested transaction data set'), comprising for example data representing one or more items the user wishes to purchase, and perhaps a full or partial description thereof, along with item, subtotal, and/or total purchase prices, by for example selecting the items for addition to the merchant application's virtual shopping cart, and has initiated a payment (e.g., 'checkout') process, merchant application 112 may display an option to the user to pay for the transaction using a wallet application 112 installed in memory 606 and/or secure element 618. Alternatively, the payment tokens selected for use in the transaction may be located in or other memory or locations on mobile device 110 or, in some cases, in virtual wallet(s) 112 or other memory(ies) or application(s) in a secure cloud resource hosted by or otherwise associated with one or more FI systems 120, 160. When the user selects to pay by wallet application 112 the device operating system may interface with such application 112 so as to obtain a suitable payment token depending on the selected form of payment. The obtained payment token may be transmitted over short-range communications 614 or long-range communication 612 for processing by a merchant transaction management backend system 130. Alternatively, a user may securely log in to a bank account administered by an FI system 120, 160 from within an application or program on user device 110 using some form of identification information (e.g., user identification and password, biometric, etc.) and, once authenticated, the user's bank may transmit electronic payment tokens to the merchant/acquirer for processing of the transaction. Processing of the electronic payment through a payment network or other entities may then proceed as described herein.

Thus, for example, in various aspects and embodiments the invention provides systems, processes, and persistently stored, machine-accessible and machine-readable programming structures that enable one or more request devices 110, such as smart phones, tablet computers, wearable devices, or other mobile devices, to interact with payment authorization management system(s) 120 by means of suitably-configured signal exchanges over a communications network 200, and, as a result of such interactions, to be cause to be generated or otherwise be provided with a secure data set, such as a token representing account information, for storage in volatile or non-volatile memory 604, 606, 618 of the device 110 and thereby enable a user to conduct transaction(s) with one or more merchant system(s) 130.

As will be appreciated by those skilled in the relevant arts, any purchaser or request device(s) 110 may be associated with multiple authorized human and/or juristic users, and/or with multiple accounts associated with such user(s). For example, each such device may be used by different authorized users and/or entities in different jurisdictions, or in different data processing contexts, as for example different social media platforms vs inside a brick-and-mortar merchant premises or particular online services (e.g., an online music or media source). A representation of, link to, and/or other data or instruction(s) associated with each validated identity may be stored in secure memory controlled by or otherwise associated with any off applications 112, 114, etc.

A further advantage offered by various aspects and embodiments of the invention is improvement in the manner in which single or multiple forms and sources of payment to be used in completing a transaction can be agreed upon in advance, at the time of a transaction, and/or after the transaction has been confirmed, between a user of a device 110 and a merchant system 130, and communicated to the bank/FI processor 120, 160, for example, by the POS 132, 134, or server 136, etc. Such methods of payment may be registered with or otherwise authenticated by the bank 160 or other trusted platform 120, in the form of select merchant payment token data sets (or "authorized merchant token data sets) described herein, so that the need for transmitting and interpreting information identifying such methods may be obviated or otherwise reduced. In this manner, for example, payment may be completed with use of an instruction to the bank 160 or other trusted platform 120 to process payment according to the agreed upon method of payment, without having to provide any details (which may be of a sensitive nature) related to the selected source or method of payment in the payment message itself.

Alternatively, such forms of payment may be negotiated between a user of a device 110 and one or more payment management authorization systems or other FIs 120, in accordance with logical structures associated with either or both of applications 112, 114, as described herein. Among other advantages, such configurations enable merchants 136 to take direct or indirect part in negotiating the form of such of such payments, and special rules, or business functions, such as promotions, special loyalty offers, etc., to be applied in conjunction with such transactions.

Thus a wide variety of improved and advantageous types and modes of payment settlement processing are enabled by the invention.

For example, at the time of a transaction, both the user of a device 110 and a merchant system 130 may agree one or more types, modes, or protocols of payment(s) to be used (e.g. credit, debit, cash bank transfer, loyalty point redemption, including one or more specific accounts associated with each such type of payment), and identifier(s) associated with the selected protocol can be transmitted to the trusted platform server 120.

In such cases, when a user initiates a purchase or other transaction with a merchant system 130, as for example through the use of the PSTN/Internet and a desktop merchant application, a variety of data and/or other signals, including for example transaction confirmation signals, may be generated by any or all of systems 120, 160, 130, and passed to the user's device 110. For example, when a purchase or other transaction request is generated Examples of ways in which the invention may be used to increase flexibility and convenience for purchasers and other users 190, merchants 130, and FIs 120, etc., in setting up preferences for and conducting payments and other electronic transactions are described in connection with in FIGS. 3 and 4. In particular, means for enabling either or both of a user 190 and merchant system 130 to designate types, protocols, rules, and/or specific accounts to be used for receiving, accepting, and otherwise processing payments are described. For example, as shown and explained in connection with FIG. 3, a purchaser or other user 190 of a network request communication device 110 is enabled to select one or more desired funding sources to be associated with payments made via a merchant transaction application 114 or otherwise in connection with purchases made through one or more specific vendors, while the merchant 130 is enabled to specify one or more preferred payment types, protocols, formats, and rules to be used in receiving or otherwise processing payment from the user 190 through the merchant application 114, independent of any preferences designated by the user 190.

Figure 3:
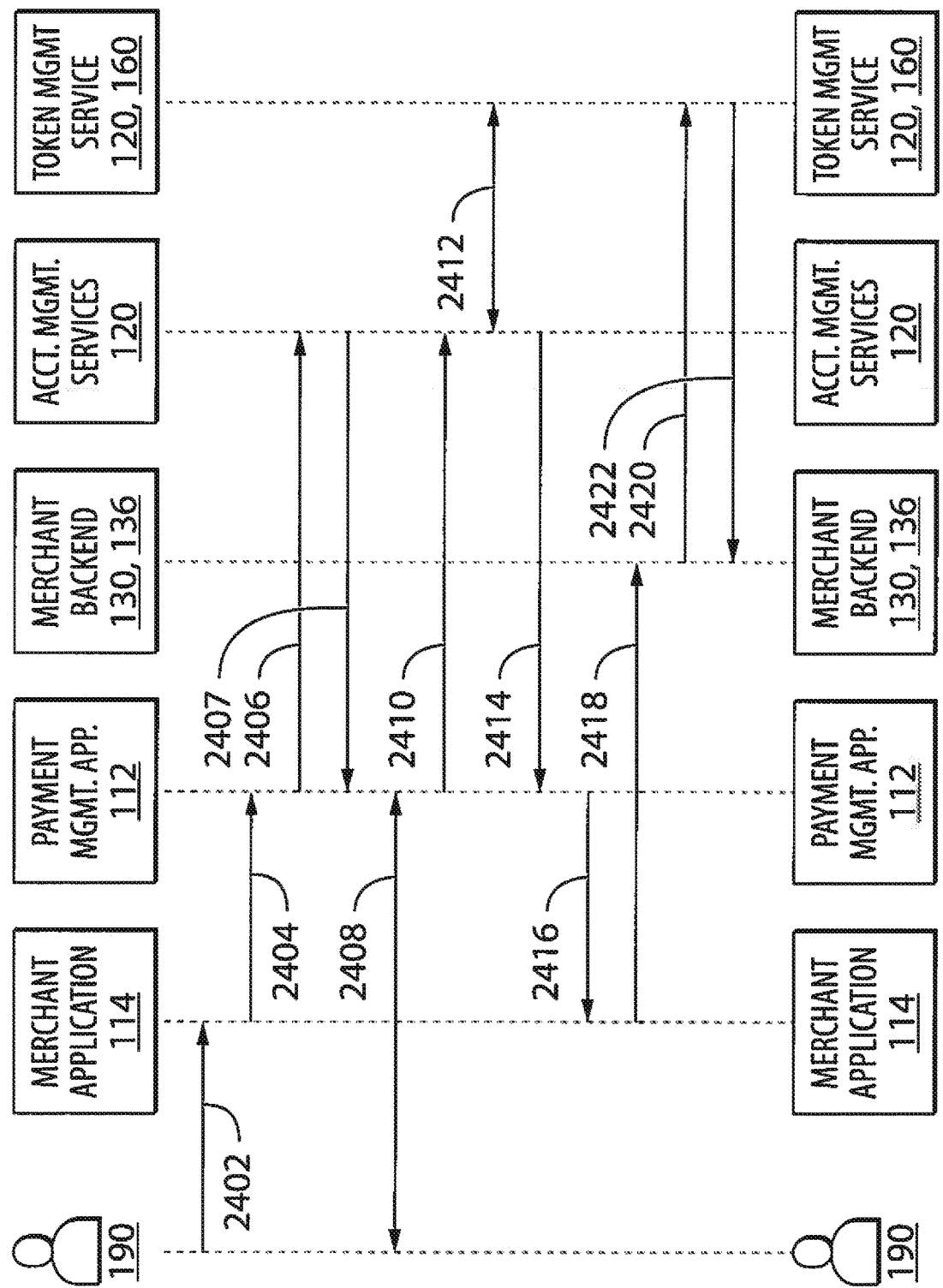
FIGS. 3 and 4 are schematic diagrams showing representative signal exchanges between components of systems for secure processing of electronic transactions in accordance with aspects of the disclosure.
Figure 4:
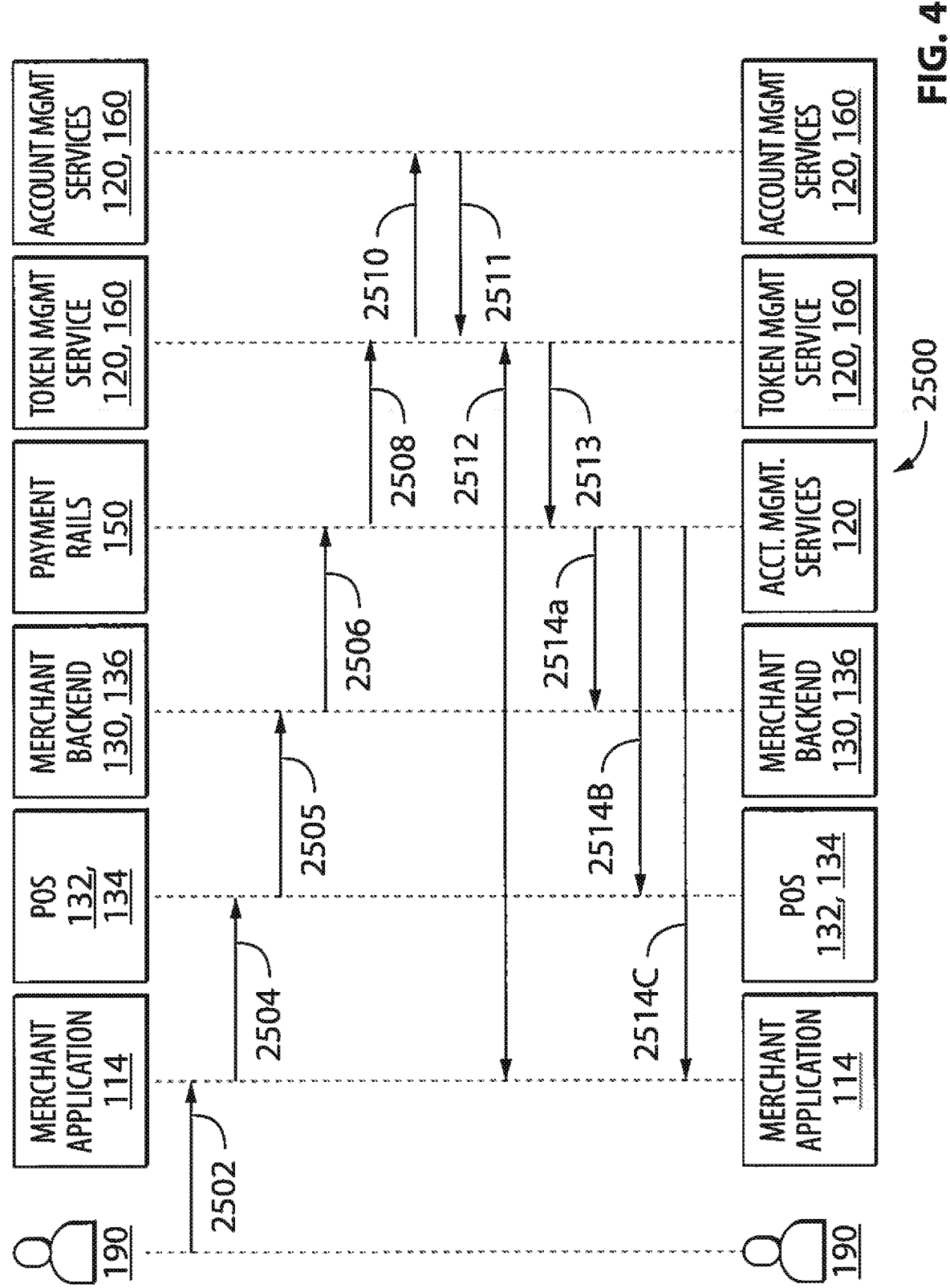

This can be accomplished efficiently through use of the systems and methods disclosed herein because, for example, as previously noted and as illustrated in the example embodiments shown in FIGS. 1, 3 and 4, merchant application(s) 114 installed on a purchaser communication device 110 can be adapted for communication with a variety of components of system(s) 100, including for example any or all of virtual wallet application(s) 112, merchant backend system(s) 130, 136, and payment authorization management systems and/or other FI system(s) 120, 150, 160, etc.

In the example shown in FIG. 3, for example, at 2402 a user 190 can invoke or otherwise access a merchant application 114 and, through the use of suitably-configured user interfaces (UIs), generate a preferred funding source instruction request data set representing one or more funding sources to be used in transactions conducted with the merchant, or through the application 114, and route the preferred funding source instruction data set to the merchant application 114.

Figure 5:
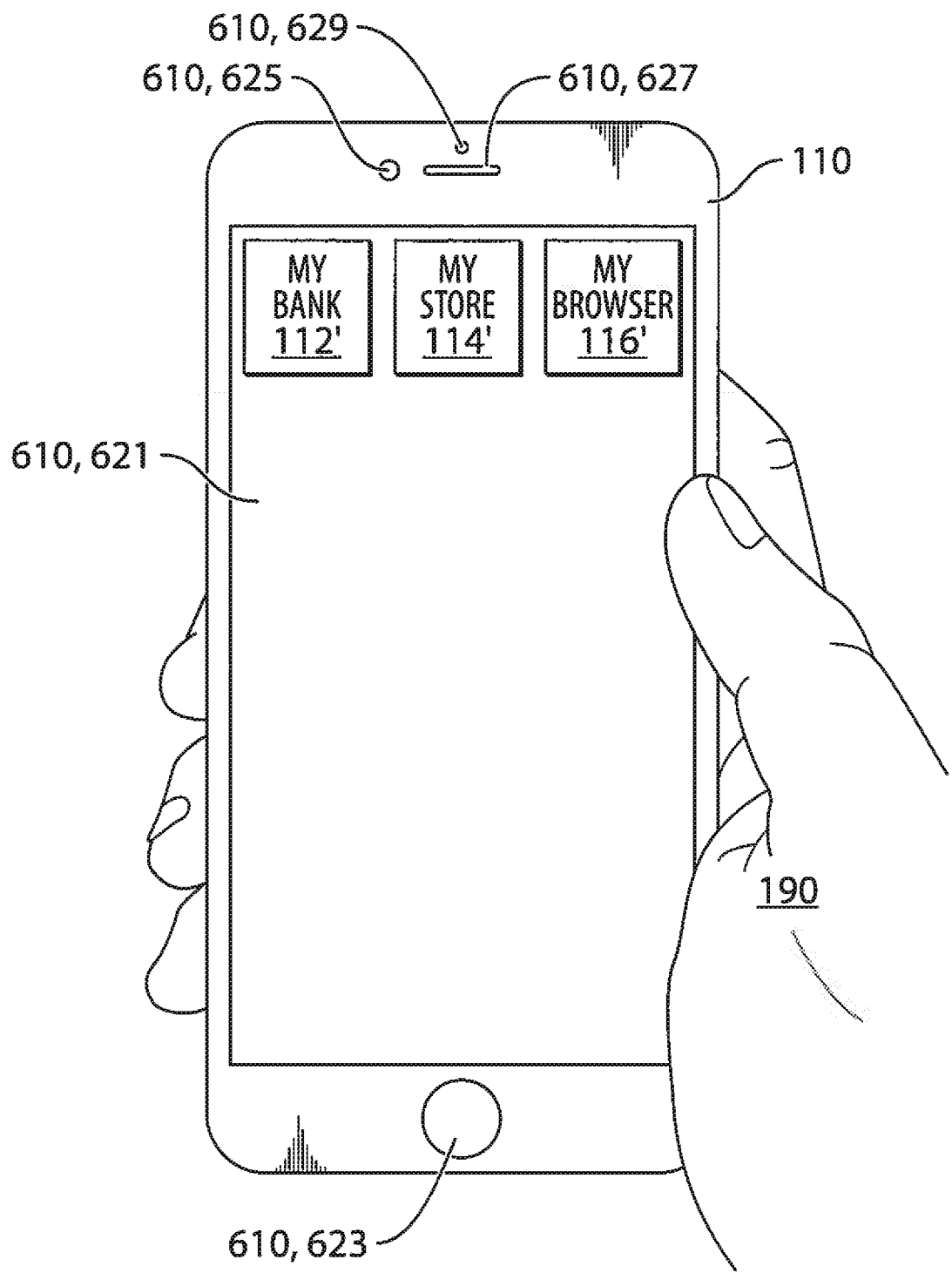
FIGS. 5-9 show embodiments of graphical user interfaces suitable for use by various embodiments of purchaser devices in implementing various aspects and embodiments of the invention.

For example, as shown in FIG. 5, a user 190 of a purchaser communication device 110 comprising one or more input/out devices 610 such as one or more touch-screens 621, select switches 623, cameras 625, microphones 627, and speakers 629 can invoke one of a virtual wallet application 112, merchant application 114, or a network browser by selecting one of corresponding application icons 112', 114', 116'.

Figure 6:
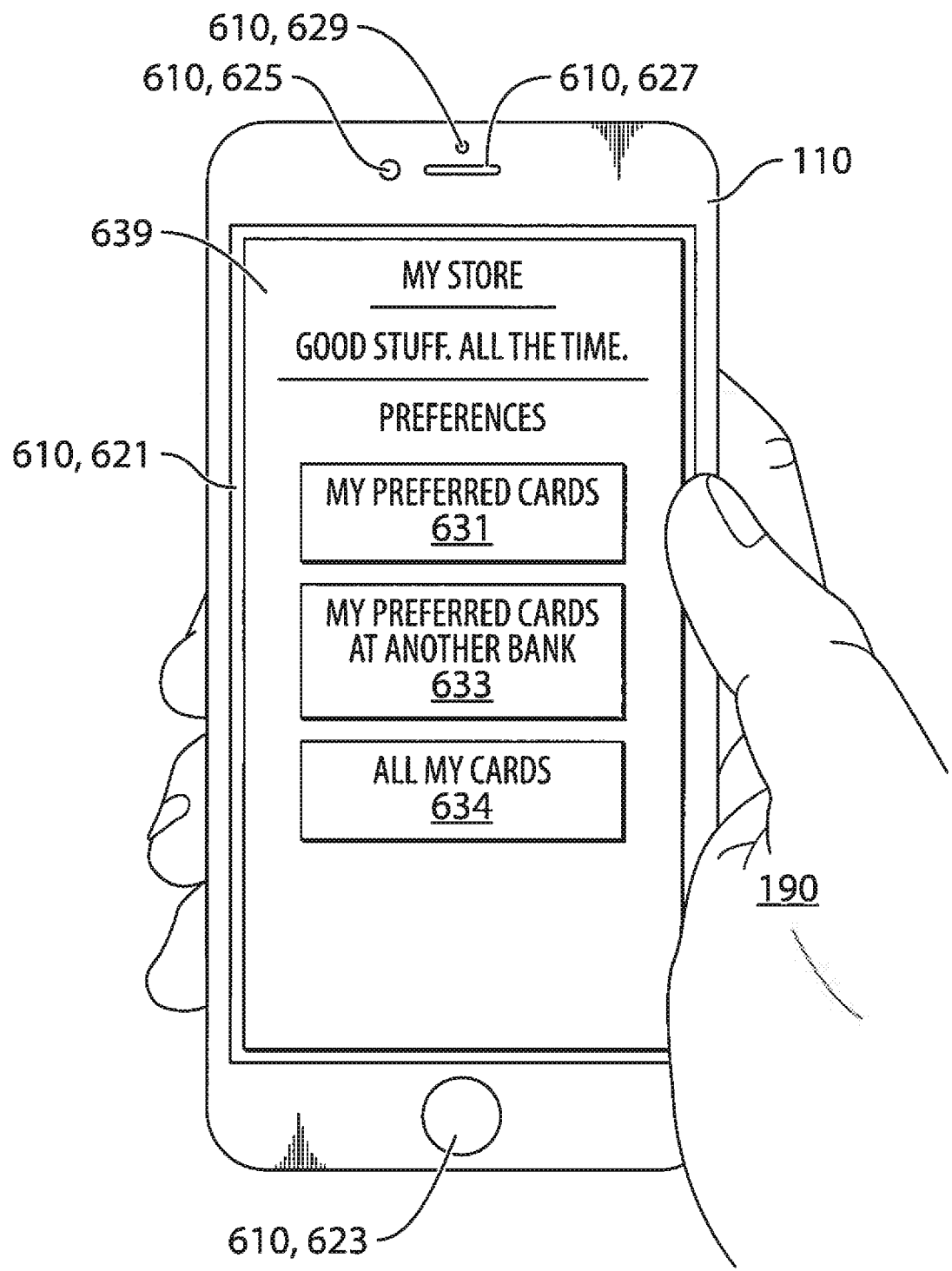

In the example shown in FIGS. 3 and 6, a user 190 has selected a "MY STORE" application icon 114' to invoke a merchant transaction communication application 114 associated with a merchant "MY STORE" and adapted to facilitate secure and efficient communications between the device 110 and merchant server 136 of a merchant transaction management system 130 as shown in FIG. 1. In the example shown in FIG. 6, invocation of the application 114 has enabled the user 190 to access a "Preferences" GUI 639 adapted to solicit designation by the user of one or more accounts to be used, for example as defaults, as sources of funds for satisfaction of one or more purchase transactions conducted with the merchant MY STORE's transaction management system 130, either directly or through the "MY STORE" application 114.

As previously noted, a purchaser communication device 110 can be provided with multiple merchant applications 114 as well as one or more virtual wallet applications 112, each of which can be configured to facilitate communications an individual bank or other FI account administration system 120 directly. Alternatively a single virtual wallet application 112 can act as a one-stop clearing house by facilitating communications with multiple FI systems 120. Merchant applications 114 can be configured to facilitate communications with any one or more account administration systems 120 directly, or in many embodiments to communicate with designated systems 120 through wallet application(s) 112, optionally at the election or designation of one or more users authorized to access the device 110. In the example shown in FIG. 6, the merchant application 114 GUI 639 has generated icons 631 to enable the user 190 to designate one or more payment accounts administered by or otherwise associated with a first preferred bank or other FI 120; 633 to enable the user to designate one or more accounts administered or otherwise associated with a second preferred bank or other FI 120; and 634 to enable a user to access a listing of accounts associated with multiple FIs 120. In each case, in the example shown, the merchant application 114 is configured to communicate with the corresponding FIs 120 indirectly, by communicating with virtual wallet application(s) 112 controlled by the user 190's device 110.

In accordance with logical structures associated with the application 114, selection of an item 634 "ALL MY CARDS" can one or more of processors 602 to generate and present a GUI such as GUI 640, and thereby enable a user 190 to designate one or more accounts associated with multiple FI systems 120 to be used as funding sources in connection with transaction(s) to be conducted with the merchant MY STORE's transaction management system 130. In the example shown in FIG. 7, selection of a command item 631 "My Preferred Cards" can enable the user 190 to designate one or more accounts associated with a preferred bank or FI 120; selection of a command item 633 "My Preferred Cards at another Bank" can enable the user 190 to designate one or more accounts associated with a second bank; and selection of a command item 634 "All My Cards" can enable the user 190 to designate one or more accounts associated with any or all of multiple FIs 120.

Figure 7:
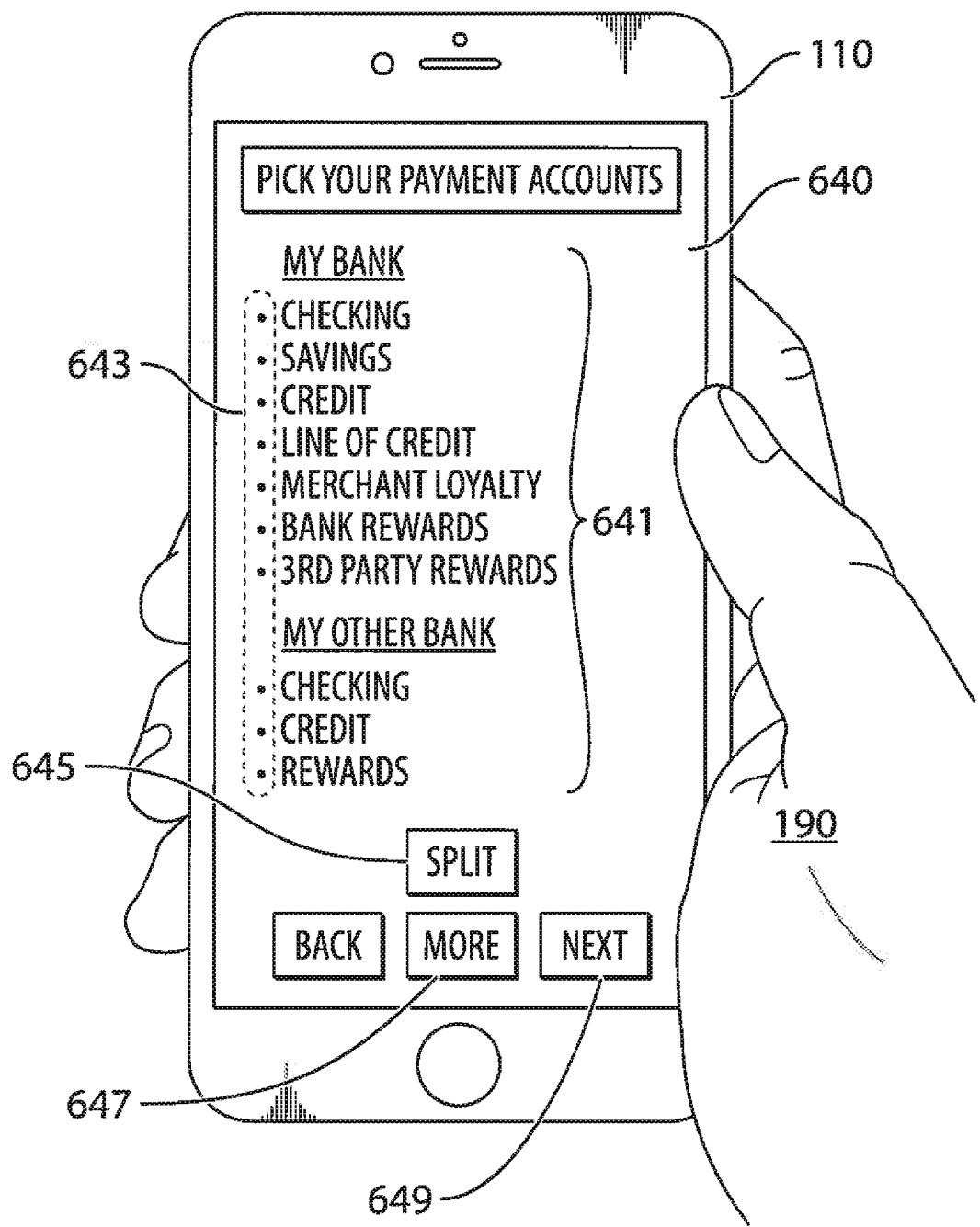

As shown for example in FIG. 7, at 2404-2408 selection by the user 190 of a command item 634 "All My Cards" can result in generation of a GUI 640 listing multiple accounts administered or otherwise associated with multiple FI systems 120. For example, invocation of the command item 634 can cause one or more processors 602 of the device 100 to generate, in accordance with instructions incorporated within logical structures associated with the My Store merchant API 114, a preferred or select payment or funding source instruction request data set (also referred to as a "request to add card" data set), and route the data set either to a single wallet application 112 configured to control access to accounts administered by multiple FI systems 120; or to multiple dedicated wallet applications 112, each configured to control access to accounts administered by a single FI system 120; or to multiple FI systems 120 directly, without working through any wallet application 112. At each step in processes 2400, 2500, data can be accessed from memory, generated, and routed to various recipients in accordance with security measures imposed by logical structures associated the application(s) 114, 112, handling the data; and therefore designated by their respective merchant 130 and FI 120 sponsors or producers. Thus the security needs of all parties can be respected, in varying combinations.

The example to follow will be described in terms of the first possibility. In such a case a "request to add card" command data set generated by a merchant API 114 and routed to a multi-FI wallet application can, for example, include:

<secure merchant application identifier><flag indicating nature of request> where:
- <secure merchant application identifier>=identifier(s) representing local resource address associated with the requesting application 114; and
- <flag indicating nature of request>=identifier(s) representing a request by an authorized user of the device 110 for data representing a list of accounts available for use by the requesting user in transactions conducted with the merchant(s) associated with the requesting merchant API 114

Among the significant advantages offered by such aspects of the invention is the enablement of merchants and/or merchant associations associated with API(s) 114 to have increased input to and control of transactions conducted with specific purchasers, or classes of purchasers, and/or transactions involving accounts controlled or otherwise administered by specific banks or FIs associated with payment authorization management system(s) 120. For example, at various points in the processes described below, the merchant is enabled to cause, through the use of suitably configured rules implemented by logical structures stored in data associated with an API 114, any of a wide variety of data communications routed to FI system(s) 120 to include data representing requests for special processing of such transactions. In such instances, request to add card data sets can, for example, include:

<secure merchant application identifier>

<merchant special processing request flag(s)> where:
- <merchant special processing request flag(s)>= identifier(s) representing one or more requests, including special merchant transaction processing requests, for special processing of transaction and/or other processes conducted between the requesting user 190 and/or device 110, merchant 130 associated with the application 114, and FI(s) associated with accounts to be specified in response to the with the request to add card data set.

Such merchant special processing request flags can include any identifiers, representing any processing requests, that can be understood and appropriately processed by merchant system(s) 130, FI system(s) 120, and optionally by either or both of user(s) 190 and device(s) 110. Examples of such processing requests include application of merchant, FI, and/or user specified rules pertaining to any of the following:
- Application of special loyalty point awards (e.g., twice nominal points to be awarded, based on value of transaction and/or specific goods and/or services involved therewith
- Special discount programs offered to preferred customers only
- Rebate programs, and special parameters associated therewith, including e.g., preferred rates for specific purchasers or classes of purchaser, based on transaction history, demographics, etc.
- Identifiers indicating FI(s)/FI system(s) 120 that a merchant or merchant 130 does or does not prefer to deal with, or will or will not transact with
- Merchant account-type preferences (e.g., merchant prefers to deal only with any one or more credit, debit, loyalty accounts, or types of accounts etc.)
- Special tracking of demographic and other data associated with transactions, and requests for transactions, and sharing of collected data with merchants and/or purchasers
- Generation of one or more pre-paid tokens, at specifically identified values
- Generation of non pre-paid tokens, with transaction value limits or caps Optionally, identifiers associated with such special merchant or other transaction processing requests can be communicated implicitly, based on either or both of the secure merchant application identifier(s) and the flag indicating the nature of the request. For example, pluralities of either merchant identifiers and/or flags can be used, a single identifier or flag indicating both the identity of the requesting merchant, or the fact that an account listing is requested, and the nature of a special processing request.

Among further options, the merchant special or other transaction processing request flag(s) can also represent or include either (a) one or more specific, one-time requested transaction amount(s); or (b) express or implied request(s) for authorized limit(s) for a single or multiple transactions. For example, as described further below, either or both of a user 190 and merchant 130 can request generation of one or more pre-paid, negotiable payment token data sets, and/or a limit to be generally authorized for future transactions, subject to verification of availability of funds at the time of a proposed transaction.

As will be understood by those skilled in the relevant arts, once they have been made familiar with this disclosure, enabling merchants associated with systems 130 to make such requests opens possibilities for new and potentially more efficient ways of conducting electronic transactions, with savings that can be shared among any or all of merchants, purchasers, and FIs.

Having received such a preferred funding source instruction request (or "request to add card") data set, at 2404 the merchant application 114 or virtual wallet application 112 can, in accordance with rules represented by logical structures associated with the application, generate one or more preferred funding source identification request data sets (or "eligible accounts list request data sets") adapted to cause polling of one or more FI systems 120 associated with accounts or other funding sources controlled by or otherwise available to the user 190 in satisfying payment transaction requests for data identifying all or some such available funding sources.

For example, on receipt of the "request to add card" command data set, a virtual wallet application 112 associated with a specific bank can parse the data set and, using flags or other identifiers as described above, execute known table look-up and value comparison techniques to determine routing information for the one or more FI systems 120 to which the request is to be routed, subject to any merchant preferences for funding FIs expressed by means of explicit or implicit special processing request identifiers. Identifiers associated with any such special processing requests suitable for consideration by target FI system(s) 120 can also be explicitly or implicitly included in the eligible accounts list request data set.

Eligible accounts list request data sets generated in accordance with such aspects of the invention can, for example, be formatted in accordance with any agreed or otherwise suitable protocol(s) and can include:

<address(es) of secure FI portals><return address identifier(s)>

<flag(s) identifying request for accounts information>

<secure user identifier/verification data>

<(optional) merchant identifier(s)>

<(optional) special merchant processing request identifier(s)> where:
- <address(es) of secure FI portals>=network resource addresses for any or all of FI systems 120 to which the request is to be routed. Where, for example, multiple FI systems 120 are to be polled for eligible accounts, multiple preferred funding source identification request data sets can be generated, and independently routed.
- <return address identifier(s)>=network resource address(es) to which responsive data is to be routed (e.g, a URL or other network identifier associated with the requesting device 110

<flag(s) identifying request for accounts information>=identifier(s) useable by recipient FI system(s) 120 for identifying the received data string as a request for an account listing <secure user identifier/verification data>=secure identifier(s) associated with authorized users or other access to accounts to be identified. Can include any suitable characters or symbols, including names, passwords, biometric data, and pointers to any such data stored on FI recipient systems 120, etc.

<(optional) merchant identifier(s)>=in cases where the identity(ies) of merchants associated with the request are not implicit in the request, or otherwise apparent, one or more identifiers associated with merchants and/or merchant systems 130 can be included. Can include names, codes, symbols, or any other suitable identifiers <(optional) special merchant transaction processing request identifier(s)>=flag(s) or other identifiers associated with special merchant transaction processing requests associated with the information request At 2406, such a request can, for example, be forwarded by a virtual wallet application 112 (or merchant application 114) installed on the user 190's device 110 to the one or more FI system(s) associated with the virtual wallet application 112. For example, logical structures associated with the application 112 (or merchant application 114) can cause one or more of processor(s) 302 to route the preferred funding source identification request data set(s) to a network or short-range communication system 612, 612 to route the request to one or more payment authorization management systems 112 via network(s) 200 or NFC or other communications paths.

On receipt, any payment management authorization system(s) 120 to which a preferred funding source identification request data set has been routed can parse the request, and based on any agreed or otherwise accepted protocols and use of table look-up or other suitable processes or techniques determine the identities of requesting purchasers or users 190, merchants identified by the request, and special preferences or rules to be applied to identification of eligible accounts, and apply such criteria to identification of any eligible accounts. For example, each account associated with an authorized purchaser can be polled, and compared to received criteria, and an eligible account data list can be assembled, for example by writing associated identifiers to one or more buffers or other temporary memory stores. In addition to criteria identified above, logical structures associated with payment authorization management systems 120 and/or processes executed thereby can be used to set or enforce account eligibility requirements, which can for example include any applicable legal requirements, bank rules (e.g., available credit, availability of debit funds and applicability of any daily or other periodic withdrawal limits, line of credit (LOC) restrictions, foreign currency exchange restrictions, etc.); requirements or restrictions imposed by merchants associated with the request; requirements or restrictions imposed by the FI on specific merchants or classes of merchants; agreements with merchants or merchant associations, etc. Subject to any such restrictions, eligible accounts can include any source(s) of funds available to the identified user, including any and all forms of demand and other deposit accounts, certificates, etc.; credit accounts, including LOCs; loyalty/rewards points accounts; foreign currency accounts, etc.

If any optional special merchant or other transaction processing requests have been included by a requesting merchant or user have been identified, the list of eligible accounts can be determined using those as criteria as well.

Thus, once the requesting user has been suitably identified and verified as authorized to access one or more funding sources associated with one or more FI systems 120, at 2406 the virtual wallet application 112 (or merchant application 114) can communicate with the FI(s) 120 to request generation of a data set representing a list of accounts available for designation as preferred funding sources with respect to transactions conducted through the merchant application 114, and at 2407 one or more processors associated with the polled FI system(s) 2407 can return, via one or more network communications systems, eligible account list data set(s) that include the following:

<originating (user return) network address>

<flag identifying account list data set><account identifier(s)> where:

<originating (user return) network address>=network resource locator(s) to which the eligible account list data set(s) are to be returned <flag identifying account list data set>=identifier(s) useable by recipient application (s) 112 (or 114) for identifying the received data string as a requested list of eligible accounts <account identifier(s)>=identifier(s) suitable for use by requesting application(s) 112, 114 in generating GUI(s) suitable for use by a requesting user 190 of one or more accounts to be used in conducting transaction(s) with the specified merchants Such data sets can also include, if/as desired, identifiers associated with merchants with whom the accounts are eligible to be used, and/or data representing information confirming or otherwise related to any merchant or user special processing requests.

At 2408, the virtual wallet application 112 (or merchant application 114) to which and eligible account list data set(s) has been returned can use the data received at 2407 to cause generation and display on the user's device 110 of a GUI 640 listing the eligible funding source(s) for selection as preferred funding source(s). This can accomplished by displaying such a GUI directly through use of logical structures associated with the virtual wallet application 112, or by returning the list data to the requesting merchant application 114 so that logical structures associated with the merchant application 114 can be used to generate and display the preferred funding source selection GUI.

Thus, as previously noted and as shown for example in FIG. 7, at 2408 selection by a user 190 2402 of a command item 634 "All My Cards" can result in generation of a GUI 640 listing multiple accounts administered or otherwise associated with one or more FI systems 120. In the example shown in FIG. 7, GUI 640 lists accounts controlled or otherwise administered by a plurality of payment authorization management systems 120 "My Bank" and "My Other Bank." Listing 641 includes checking, savings, credit, LOC, merchant loyalty, bank loyalty, and $3^{rd}$ party rewards accounts administered by or available through My Bank, as well as checking, credit, and rewards accounts administered by My Other Bank.

Accounts such as third-party rewards accounts (such as that listed under My Bank) which are not directly administered by a FI 120 by whom an account listing has been generated can for example be accounts linked to a bank, or to a merchant, or to a purchaser, by agreements between any or all of the bank, merchant and purchaser. For example, a merchant associated with a merchant API 114, with respect to whom a user 190 wishes to designate one or more accounts to as sources of funds for transactions conducted with the merchant, can identify special rewards rules by means of one or more special merchant processing request identifier(s), as described above, and thereby authorize or cause an FI system 120 generating an eligible account listing to include the third party rewards account in the listing.

A GUI listing eligible accounts can include one or more radio button items 643 or other GUI devices in association with each account, in order to enable the user 190 to select one or more accounts as preferred funding sources for transactions with the specified merchant(s).

An important feature enabled by such aspects and embodiments of the invention is the ability to identify multiple accounts as preferred funding sources for transactions. For example, split pay features such as those described below, and in the incorporated priority applications, can be applied. Thus, in the example shown in FIG. 7, user 190 can select any desired number of the displayed accounts by touching the corresponding radio button item(s) 643.

When multiple accounts have been selected, the user can be provided with a choice of establishing a priority list, with first choices being exhausted before secondary or tertiary choices are used to satisfy transaction payments. For example, the merchant or wallet application 112, 114 can generate a GUI which enables the user to use a physical or virtual keyboard to identify a desired precedence, or the order in which selections are designated can be used to establish the desired precedence.

If, alternatively, the user wishes to apply split pay techniques, the user can select a split pay option item 645 to invoke GUIs adapted for precedences, ratios, etc., to be used in split pay processes, for example as described in the incorporated references.

If a listing 641 of eligible accounts is too long to be displayed conveniently on a single GUI screen, the user can use a "NEXT" command item 647 to access a continued list.

When the user is satisfied with his/her selections, he/she can select a command item 649 "NEXT," "DONE," "SEND," etc., and at 2410 the virtual wallet application 112 or merchant application 114 can route a selection of one or more preferred funding sources selected by the user 190 in response to the list displayed at 2408 to the FI(s) 120 by which they are controlled or otherwise administered, along with data implicitly or explicitly representing an instruction or request for generation of a preferred funding source token based on the user's selection.

For example, in accordance with logical structures associated with the application 112, 114 which generated the GUI 640, the application 112, 114 can generate a merchant token authorization request data set, or "select merchant payment token request data set," and route it to the payment authorization management system(s) 120 intended to process transactions conducted between the user 190 or device 110 and merchant system(s) 130. Such a select merchant payment token request data set can, for example, include data representing:

<address of secure FI portal><originating (user return) network address>

<flag identifying request for token authorization>

<secure user identifier/verification data><selected merchant identifier(s)>

<selected payment account identifiers> where:
<address of secure FI portal>=network resource locator associated with responsible payment authorization management system 120

<originating (user return) network address>=network resource locator(s) to which confirmations and/or other communications are to be returned <flag identifying request for token authorization>=identifier(s) useable by recipient system 120 for identifying the received data string as a request for a secure payment authorization token associated with preferred transaction payment accounts to be used with identified merchant(s)

<secure user identifier/verification data>=data representing token(s) or other credential(s) securely establishing authority of the requesting user to access accounts identified in the request <selected merchant identifier(s)>=data representing information suitable for routing transaction payment(s) to the intended merchant recipient, or recipient account(s), or other identifier(s) associated with selected merchants <selected payment account identifiers>=data representing user accounts designated at 2408 as sources of transaction payment(s)

At 2412, the corresponding FI system(s) 120 can create preferred funding source token(s) and link or otherwise associate the token(s) with the selected funding sources. This can be done, for example, by a primary banking/account administration processor 120 or by an associated or independent token service processor 160, as shown in FIG. 1. Generation of such tokens can be subject to adjudication by the receiving FI system(s) 120, for example to ensure that requesting user(s) 190, prospective authorized merchants 130, and/or combinations of the two, are not subject to legal, FI, or other restrictions in conducting transactions.

For example, a secure token generation service 120, 160 associated with the FI system 120 responsible for managing accounts accessible by the requesting user can generate and store in secure persistent memory, such as a suitably secure database of select merchant payment token data sets, an unpredictable select merchant payment token (or "selected merchant payment token") to serve as a unique identifier of (i) the merchant(s) or merchant account(s) to which payments associated with use of the token are to be made; and (ii) the accounts to be used as funding sources for transactions between the merchants) and the requesting user. The token can also be linked, e.g., through a table-look up process, with any special business functions or requests associated with the token request, including for example any special loyalty account rules, discounts, etc., specified or requested by the corresponding merchants, users, or FI(s) 120.

Any suitably coded or otherwise non-predictable character set(s) (e.g., random or pseudo-random string(s) of letters, numbers, special characters, etc.) or other credentials can be used as an authorized or selected merchant payment token generated at this step.

Among the many advantageous features offered by various aspects and embodiments of systems and processes in accordance with the invention is the ability of banks and other payment authorization management systems 120 to generate and maintain tables or other databases or data sets of select merchant payment token data sets, for use in adjudicating, authorizing and otherwise processing transaction requests received from devices 110 on behalf of purchasers and other requesting users 190. As will be apparent to those skilled in the relevant arts upon a reading of this disclosure, by enabling each of the requesting user 190, FI system 120, and merchant 130 to specify special requirements or requests, including choices of payment accounts, discounts and other special offers or rules, etc., to be applied in processing such transactions—to individual purchasers or groups or classes of purchasers—the invention opens up a very wide range of new possibilities in electronically-enabled commerce, with the ability to rapidly and efficiently modify transactional processes at any time.

For example, an authorized or select merchant payment token data set generated by a payment authorization management system 120 in accordance with this aspect of the invention can include multiple data records, each including some or all of the following, along with any other required or desired data:

<non-predictable authorized token><identifiers associated with account(s) to be used as transaction funding sources><identifier(s) associated with requesting merchant and/or accounts to be credited in transaction(s)><flag(s) identifying merchant transaction processing requests or other special business function rules>

<(optional) pre-authorized transaction limit(s)> where:
<non-predictable select merchant payment token>=a select merchant payment token comprising any suitably non-predictable character set(s) (e.g., random or pseudo-random string(s) of letters, numbers, special characters, etc.) or other credentials uniquely associated with the merchant(s) associated with the request and accounts to be used as sources of payment funds
<identifiers associated with account(s) to be used as transaction funding sources>=data representing identifier(s) suitable identifying account(s) to be used a funding sources to satisfy payments in transactions conducted between the requesting user 190/device 110 and merchant(s) identified in association with the token request
<identifier(s) associated with requesting merchant and/or accounts to be credited in transaction(s)>=data representing account number(s) or other routing information suitable for use in routing transaction payments to merchants identified in association with the token request
<flag(s) identifying merchant transaction processing or other special transaction processing requests>=flags or other data representing or referring to special transaction processing requests to be applied in processing of transactions associated with the select merchant payment token. Requests can originate from corresponding merchant(s) 130, purchaser or other authorized account users 190, or account administration FIs 120, and subject to any applicable laws, rules, or agreements, can be changed at any time subsequent to creation of the select merchant payment token
<(optional) pre-authorized transaction limit(s)=any pre-authorized transaction limits imposed by requesting user(s) 190, merchant(s) 130, or FIs 120

As explained further below, on receipt from an authorized user 190 and/or device 110 of a transaction request data set comprising data representing an authorized merchant payment token, a payment authorization management system 120 controlling such a data set can use the select or authorized merchant payment token to look up an associated select merchant payment token data set, identify applicable parties and rules, and apply them to adjudication and other processing of the transaction request.

Optional pre-authorized transaction limits can be included where, for example, a pre-paid token is to be generated and stored on a user's device 110, or within secure memory at an account administration FI 120, for later access by the user in transactions with the merchant. In such cases funds can be set aside in a temporary or permanent sequestered or 'buffered' account until expended in a transaction.

In other cases, generation of the Merchant API token can be created in advance simply in order to speed transaction processing at the time a transaction is desired, while uniquely identifying all applicable payment rules, including special discounts, loyalty rewards, and accounts to be used as transaction funding sources. In such cases, at the time of transaction the normal processes of verifying availability of sufficient funds to settle a transaction, etc., can be applied.

At 2414, the preferred funding source token, or select merchant payment token, can be returned by the FI system 120 that generated it to the requesting wallet application 112 or merchant application 114, which at 2416 can forward it, or a modified or replacement token, to merchant application 114 associated with the token request process 2400.

For example, at 2416 the select merchant payment token can be routed by an account management system FI 120 to the requesting user 190's virtual wallet application 112, and at forwarded by wallet application 112 to a merchant application 114 associated with the authorized merchant, which at 2418 can in turn forward the token to the corresponding merchant back-end system 130.

Thus, for example, at 2418 a merchant application 114 can generate a select merchant token confirmation data set, comprising data representing one or more secure purchaser identifiers associated with the prospective purchaser 190 and/or device 110 and the same or another select merchant payment token, and route the select merchant token confirmation data set to a merchant transaction management system 130, in order enable the merchant backend system 130, 136 associated with the merchant application 114 to store the select merchant token and optionally the secure purchaser identifiers in secure persistent storage and optionally to request generation of a special payment token to be used by the merchant application 114, 630 in internal or other processing transaction payment requests originated by the user's device 110. The select merchant token and secure purchaser identifier(s) can be used by the merchant transaction management system 130, for example, to confirm the validity of proposed transactions and to route inquiries, confirmations, transaction receipt data, etc. to one or more user devices 110, and to route confirmations, inquiries, and other required or desired information to payment authorization management system(s) 120 as appropriate or otherwise suitable for negotiating, executing, confirming, and clearing transactions.

In addition, at 2420, the merchant back-end system can route the token to banking/token management services associated with FI system(s) 120, 160 a request for confirmation, with identifiers representing any special transaction processing requests, and/or for generation of a separate unpredictable identifier to be associated by the merchant system 130 with the user 190 in processing of any transactions initiated by the user, etc. Such a select merchant token confirmation request data set can include, for example:

> <select merchant network address/merchant identifier(s)>
>
> <flag indicating nature of request><select merchant payment token>
>
> <merchant account identifier(s)><flag(s) identifying (updated) transaction processing requests>< (optional) pre-authorized transaction limit(s)> where:
- <select merchant network address/merchant identifier(s)>=network resource locator(s) to which confirmations and/or other communications are to be returned to the select merchant back-end system 130
- <flag indicating nature of request>=data interpretable by the receiving FI system 120 to indicate any specific nature of the request, and type(s) of data to be expected in subsequent data fields
- <select merchant payment token>=select merchant payment token generated at 2412, or suitable proxy
- <merchant account identifier(s)>=any required or desired identifiers associated with merchant accounts to be used in transaction processing, where for example required or desired in conjunction with the specific request identified above
- <flag(s) identifying (updated) transaction processing requests>=flags or other data representing or referring to special merchant transaction processing requests to be applied in processing of transactions associated with the select merchant payment token or updates thereto, requested by merchant system 130. In addition to loyalty program, discounts, and other requests to be applied to transactions initiated by the user 190 or device 110 associated with the merchant token generating request, such merchant-initiated special processing requests can include preferred payment protocol(s) to be applied to communications respecting transactions conducted with the merchant system 130
- <(optional) pre-authorized transaction limit(s)>=if not included in updated special processing request, new or updated limits to be associated with transactions requested by user 190 or device 110 associated with the select merchant payment token As important advantage offered by this aspect of the invention is that select merchant token confirmation request data sets can be generated and routed by merchant transaction processing systems 130 step 2420 or any subsequent time, in order for example to revise, delete, replace or otherwise modify one or more merchant transaction processing requests, so that, for example discounts on various specified goods and/or services can be increased or decreased, rewards or loyalty program rules revised, etc.

For example, by including in such select merchant confirmation request data sets data representing one or more purchasers 190, awards programs, discounts, etc., applicable to one or more persons, or classes of persons, can be created, replaced, removed, or otherwise modified, by causing one or more payment authorization management system systems 120 to update pluralities of authorized merchant token data sets and/or select merchant data sets.

As a further example, at 2420 the merchant backend system 130, 136 can generate and forward to the FI system 120 associated with the preferred funding source(s)/merchant token request the same or another merchant application payment token request data set. An important advantage offered by this aspect of the invention is that the merchant application payment token request data set or merchant confirmation data set can include data representing a request that payments made between the requesting user 190, device 110, and/or merchant application 114 be formatted in accordance with an desired type or protocol, independent of the preferred funding source(s) designated by the user 190. For example, if the user 190 has requested that transactions initiated through the merchant application 11 be funded using one or more debit and/or points accounts, as described above, the merchant system 130 can request that payments drawn from such accounts be processed in accordance with EMV (Europay-Visa-MasterCard) and/or other credit protocols. As will be apparent to those skilled in the relevant arts, the invention enables the user 190 and merchant 130 to independently designate one or more preferred funding source types and protocols to be used in processing transactions between the user's merchant application 114 and the requesting user 190.

At 2422, the responsible FI 120 can return a suitably-formatted select merchant payment token, or confirmation of an earlier-generated token, to the requesting merchant back-end system 130 for use as described herein. Such confirmation can further include, for example, data representing confirmation or proposed modification(s) of special transaction processing requests forwarded (directly or indirectly) by the authorized merchant system 130. Thus, for example, in various aspects and embodiments payment authorization management systems 120 can be configured to parse data representing merchant transaction processing requests and cause the corresponding requests to be reviewed for compliance with legal, regulatory, and FI policies, optionally automatically according to suitably-configured heuristic analyses, or by human regulatory and/or policy compliance officers; and, when requested modifications are approved, cause the associated FI system(s) 120 to generate and route to requesting merchant transaction management system(s) 130 suitably-configured merchant transaction processing request confirmation data set(s) comprising flags or other data representing confirmation of acceptance by a payment authorization management system of one or more merchant transaction processing requests.

For example, at 2422 in response to receipt of a select merchant token confirmation request, a responsible FI system 120 can update its data set associated with the authorized merchant token, and return the same or another suitable token to the Merchant back end. The confirmation can include any data representing confirmation of any special merchant-side special function requests, such as special savings, rewards points offers, etc.

Thus for example a token confirmation data set returned by an FI 120 to a requesting merchant backend system 130 can include:

> <merchant network address/merchant identifier(s)>
>
> <flag indicating nature of confirmation><select merchant payment token>
>
> <user/purchaser identifier(s)><flag(s) identifying special transaction processing requests><(optional) pre-authorized transaction limit(s)> as explained above.

As one example, in accordance with the examples described above, such a merchant application payment token or other select merchant payment token can be provided in a form suitable for processing using "conventional" payment rails 150 through, for example, use of a discretionary field in a "conventional" transaction payment data set. For example, using the example described above, an select merchant payment token can comprise a plurality of encoded or otherwise unpredictable data sets or items, formatted as follows:

<token type><issuing FI><currency><value><time stamp>

<issuer ref><discretionary data>

Where:
- <token type>=format associated with the payment token, e.g. a credit token (EMV, etc.), debit token, etc. designated by the merchant system 130 at 2420 in FIG. 24
- <issuing FI>=identifier(s) associated with the FI 120 that issued the token
- <currency>=US dollars, Canadian dollars, Yen, etc. to be associated with value(s) represented by the token
- <value>=amount of currency of specified type payable by the issuing FI on presentation of a pre-paid token, or a transaction limit associated with a reusable or other token to be presented with a transaction verified at the time of purchase
- <time stamp>=date/time of token creation; optionally useful also for determining expiration of token after given length of time, etc.
- <issuer ref>=token reference number generated by the issuing FI, can be tied, for example, to a specific transaction and/or user account. Etc.
- <discretionary data>=select merchant payment token as described above, thus data representing the funding source(s) designated by the user 190 at 2408

In such cases, as a process of parsing all received transaction data strings, an FI 120 can parse a received transaction request data set associated with an select merchant payment token, and can look up the associated select merchant payment token data set to process the transaction according to specified special transaction requests, as described above.

As noted above, through generation and processing of suitably-formatted select merchant payment token data sets, the invention can be used to enable the use of multiple funding sources to be applied toward the satisfaction of purchase transactions. In various embodiments, such payments can be processed through the use of conventional 'payment rails' provided by third-party FI system(s) 150, by generating transaction request data sets comprising select merchant payment tokens in discretionary data fields of EMV and/or other traditional payment protocols.

For example, such use of select merchant payment tokens can be used to facilitate payments made according to Applicant's unique split-pay techniques. As one example, an select merchant payment token received by an FI 120 in a discretionary field of a transaction request formatted according to the EMV protocol can be used to look a corresponding authorized merchant data set. The authorized merchant data set associated with the select merchant payment token can include a split-pay data set comprising the following bits:

<SN/S1/P1/S2/P2/SX/PX>

Where:
- SN=number of funding sources represented
- S1=first funding source identifier
- P1=percentage or amount of value to be funded by source 1
- S2=second funding source identifier
- P2=percentage or amount of value to be funded by source 2
- SX=X$^{th}$ funding source identifier
- PX=percentage or amount of value to be funded by source X It may be seen by the foregoing that in various aspects and embodiments the invention provides networked payment authorization management systems 120, wherein such a system comprises one or more network communication systems 124, one or more data processors 122, and one or more persistent memory devices 126, the at least one persistent memory device 126 comprising stored, machine-interpretable instructions adapted to cause the at least one data processor to receive from a purchaser communication device 110, using the at least one network communication system 124, a select merchant payment token request data set, the select merchant payment token request data set comprising data representing at least one or more selected merchant identifiers and one or more selected payment source identifiers; to generate a secure select merchant payment token; generate an authorized merchant token data set comprising at least the select merchant payment token, the one or more selected merchant identifiers, and the one or more payment source identifiers; cause the authorized merchant token data set to be stored in any or all of secure persistent memories 126, 139, 606, 604; using the same or another network communication system 124, route the authorized merchant token data set to the same or another purchaser communication device 110; and receive from a merchant transaction management system 130, using the same or another network communication device 124, a select merchant token confirmation request, the select merchant token confirmation request comprising data representing at least the select merchant payment token.

In the same and further aspects and embodiments, the invention provides networked merchant transaction management systems 130, wherein such a system comprises one or more network communication systems 138, one or more data processors 137; and one or more persistent memory devices 139, the at least one persistent memory device 139 comprising stored, machine-interpretable instructions adapted to cause the at least one data processor 137 to receive from a purchaser communication device 110, using the at least one network communication system 138, a select merchant payment token authorization request data set, the select merchant payment token authorization request data set comprising data representing at least one or more secure purchaser identifiers and a select merchant payment token; generate a select merchant token confirmation request data set, the select merchant the select merchant token confirmation request data set comprising data representing at least the select merchant payment token, and optionally one or more merchant transaction processing requests; and, using the same or another network communication system 138, route the select merchant token confirmation request to a payment authorization management system 120. Such optional merchant transaction processing requests can, for example, include data representing requests that a discount to be applied to one or more price terms associated with transaction request data sets generated by one or more designated purchaser communication devices; and/or new, special, or modified a loyalty account points award rules to be applied with respect to transactions associated with transaction request data sets generated by one or more designated purchaser communication devices.

Moreover, in the same and other aspects and embodiments, the invention provides purchaser communication devices 110, wherein such a device comprises one or more one data communication systems 612, 614, one or more data processors 602, one or more of input, output, and input-output devices 610, 621, 623, 625, 627, 629, etc.; and one or more persistent memory devices 606, 604, 618, the at least one persistent memory device 606, 604, 608 comprising stored, machine-interpretable instructions representing a merchant transaction management application 114 and adapted to cause the at least one data processor 602 to control the generation, receipt, and processing of data, routing of data using the at least one data communication system, and access to secure persistent memory 618, in accordance with one or more logical structures associated therewith. The same or another persistent memory device(s) 606, 604, 618 of the purchaser communication device 110 can comprise stored, machine-interpretable instructions representing a payment management application 112 and adapted to cause the same or another at least one data processor 602 to control the generation, receipt, and processing of data, routing of data using the same or another at least one data communication system, and access to the same or other secure persistent memory in accordance with one or more logical structures associated with the application 114, separately from the application 112. The at least one processor 602 can further be configured to, in accordance with logical structures associated with the merchant transaction application 114, receive from at least one input device 610 signals representing a command to designate one or more payment source accounts to be used in funding transactions conducted with at least one select merchant 130; in accordance with logical structures associated with the payment management application 112, route to at least one payment authorization management system 120 an eligible accounts list request data set, the eligible accounts list request data set comprising data representing at least one or more purchaser identifiers; and receive from the at least one payment authorization management system 120 an eligible accounts list data set, the eligible accounts list data set comprising data representing at least one or more identifiers associated with each of one or more payment source accounts eligible for use in funding purchase transactions. The at least one processor 602 can further be configured to, for example, generate and display on an output device 610 a suitably-configured GUI 640 for use by the user 190, and thereafter receive from at least one input device 610, in response to selections made by the user 190, signals representing a designation of at-least one of the one or more payment source accounts eligible for use in funding purchase transactions, and route to the at least one payment authorization management system 120 a select merchant payment token request data set comprising data representing at least identifiers associated with the one or more designated payment source accounts to be used to fund transactions conducted with the at least one select merchant 130. Moreover, in accordance with logical structures associated with the payment management application 112, the at least one processor 602 can be configured to receive from the payment authorization management system 120, via the same or another data communication system 612, 614, a select merchant payment token; and in accordance with logical structures associated with the merchant transaction application 114, route the select merchant payment token to at least one merchant transaction management system 130 associated with the merchant transaction application 114, using the same or another data communication system 610, 612.

Among the many advantages offered by the various aspects and embodiments of the invention is increased security, because bank and other funding source account numbers, which are in some circumstances subject to fraudulent misuse, need not be communicated between devices 120, 130, 110 at all; rather proxy identifiers such as "my checking account" or "my Merchant rewards account" can be exchanged, and mapped into actual routing and account information by the responsible payment authorization management system 120. And when such numbers or other sensitive information needs to be communicated, it can be communicated solely through applications 112 generated by the FI system 120 itself, so that control over security is not lost. Thereafter, secure select merchant tokens can take the place of any one or more account numbers or other identifiers required for processing of payments and settlement of transactions.

Moreover, using systems and processes as described above, FI's 120, purchasers 190, and optionally merchants 130 can agree on payment funding sources without any need for the merchant 130 to know the funding sources, or even the type(s) of funding sources involved. In addition, merchants and purchasers need not agree on payment protocols to be used, so long as either or both can communicate with the FI system 120.

To initiate a transaction using one or more select merchant tokens generated according to the foregoing, a user 190 may invoke a merchant application 114 on a device 110 and select one or more items (good and/or services) to be purchased, rented, leased, etc. For example, upon accessing a merchant application 114 the user 190 can use any suitably-configured keyboards, keypads, pointers, touch screen devices, and/or other input/output device(s) 610 in conjunction with suitably-configured user interface display screens to designate such goods or services. As part of a checkout sequence, merchant application 114 may transmit (directly or via any other suitable components, such as mPOS or POS device(s) 132, 134) a request to merchant backend 136 a request for confirmation of purchase terms and other details, including for example price(s), quantities, goods/services to be purchased, date/time of delivery, location of delivery or pickup, etc.

Alternatively, a user may initiate a transaction from within any other application or program 112, 116, etc. by selecting a suitable start-up command item 112, 116, etc. As part of a checkout sequence, for example, a user can use any suitably-configured I/O devices 610, in conjunction with suitably-configured user interface I/O display screens, to select a wallet application 112 for payment. Such selection may be in response to presentation of multiple different payment options, including those which do not use a wallet application 112.

An example process 2500 for use of an select merchant payment token generated in accordance with process 2400 shown in FIG. 3 in order to complete a payment transaction is shown in FIG. 4.

Process 2500 can begin at 2502, when a user 190 accesses a merchant application 114 online, or at a merchant POS 132, 134, or uses a general internet browser to access a merchant online e-commerce application hosted by a merchant system 136, to negotiate a purchase transaction.

Figure 8:
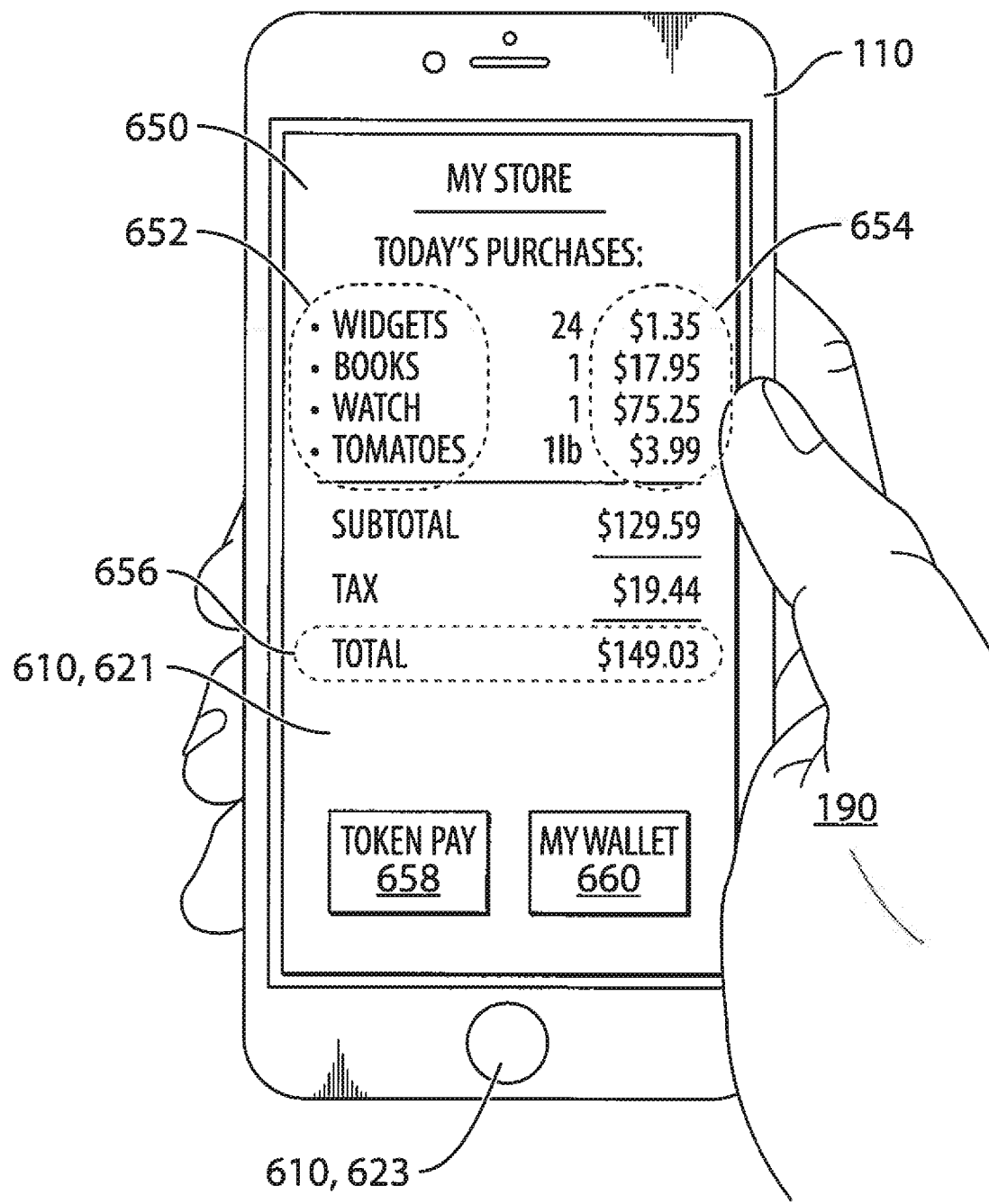

At 2504, for example, a user of a merchant application 114 associated with a merchant "My Store" as described above who has used one or more GUIs generated by the merchant application 114 to identify one or more items for purchase can be presented with a GUI 650 such as that shown in FIG. 8, comprising a list 652 of items to be purchased, a list 654 of prices associated with the items to be purchased; a total purchase price 656 (including any applicable taxes, etc.) to be paid, and one or more command items 658, 660 associated with payment options.

Selection of command item 660 "My Wallet" can cause processor(s) 602 of the user's device to invoke a virtual wallet application 112, and process payment in accordance with logical structures associated with the application 112. Such processes can, for example, result in generation of a transaction request data set, and routing of such data set to an FI system 120 associated with the virtual wallet 112 for processing and payment using one or more accounts designated through the virtual wallet application 112. In such a case the user 190 can be charged, and pay, the full purchase price 656 shown in FIG. 8.

Alternatively, selection command item 658 "Token Pay" can cause processor(s) 602 of the user's device to generate and at 2505 route to a corresponding a merchant POS system 132, 134, a merchant backend system 130, 136, an select merchant payment token transaction request data set comprising an select merchant payment token generated in accordance with process(es) 2400 described above. Such an select merchant payment token transaction request data set can, for example, be formatted according to any desired payment protocol, and can comprise:

<address of secure FI portal><originating (user return) network address>

<select merchant payment token><purchase price> where:
<address of secure FI portal>=network resource locator associated with responsible payment authorization management system 120
<originating (user return) network address>=network resource locator(s) to which confirmations and/or other communications are to be returned
<select merchant payment token>=unpredictable character set(s) or other credentials uniquely associated with the merchant(s) associated with the request and accounts to be used as sources of payment funds, as described in connection with process 2400 above
<purchase price>=nominal purchase price to be paid for the transaction, as shown for example at 656 in FIG. 8 and paid by a user who elects payment through a virtual wallet application 112.

At 2506, a network communication system of the merchant backend system 130, 136 can forward the select merchant payment token transaction request data set to the secure FI portal address, optionally (as shown at 2506) via conventional transaction processing systems (payment rails) 150.

Alternatively, at 2504-2508 the select merchant payment token transaction request data set can be forwarded directly to the secure FI portal address by the merchant API of the user's device 110, using one or more short-range or network communications systems 612, 614, without making use of either a merchant backend system 136 or payment rails 150.

At 2508-2510 the payment authorization management system 120 to which the transaction request data set has been routed can parse and adjudicate the request. For example, by interpreting the select merchant payment token included in the data set and using it, by means of table-look or other processes in a suitably-configured data base of select merchant payment token data sets, the FI system 120 can identify the corresponding authorized merchant data set and confirm the existence and validity of the data set, availability of funds in identified source accounts, etc., permissibility under applicable laws, regulations, and rules etc.

Moreover, at 2508 the payment authorization management system 120 can identify and apply and special transaction requests designated by the merchant 130 or other parties. For example, where a merchant 130 has requested application of one or more discount, rebate, or loyalty awards rules, the FI system 120 can confirm the propriety of their application to the current request. Accordingly, for example, the system 120 can determine that a discount is to be applied, and calculate a reduced or otherwise adjusted price to be applied to the transaction.

At 2510 the payment authorization management system can confirm the availability of adequate funds, rewards points, etc., to satisfy the transaction request. This process can, for example, involve application of split-pay processes described above, communications with third-party rewards administrators 160, etc., and conversion (or request for conversion) of loyalty or other rewards points to equivalent cash value, conversion of foreign currencies, etc.

Conditioned upon availability of adequate funding resources, at 2511 the payment authorization management system 120 can approve the request, and debit or otherwise update funding source accounts to settle the transaction. This can for example include notifying third-party credit, loyalty, rewards program administrators, etc., of the transaction and approval of the application of resources associated with such accounts toward the transaction. As will be understood by those skilled in the relevant arts, such transaction settlement procedures can proceed in real time, or periodically (e.g., end of day or business week) in accordance with a wide variety of accepted or otherwise-desired processes or conventions.

As shown in FIG. 4, token management processes and account crediting, debiting, and other updating/administrative procedures can be implemented by a single FI system 120, or can be divided along any desired or required lines. For example, storage, parsing, and maintenance of records pertaining to select merchant payment tokens can be handled by specialized or otherwise separate token management services 160, while account administration procedures can be handled by separate FI(s) 120.

In embodiments where an FI system 120, 160 applies special transaction processing requests such as discounts, rebates, or special loyalty points awards, at 2512 the system 120, 160 can generate a purchaser transaction approval data set, and route it directly or indirectly to the requesting merchant application 114. Such a purchaser transaction approval data set can, for example, include:

<originating (user return) network address>

<final transaction terms> where:
<originating (user return) network address>=network resource locator(s) to which confirmations and/or other communications are to be routed
<final transaction terms>=data representing authorized and optionally updated transaction terms, including discounted or otherwise updated price(s), proposed loyalty points awards, etc.

Figure 9:
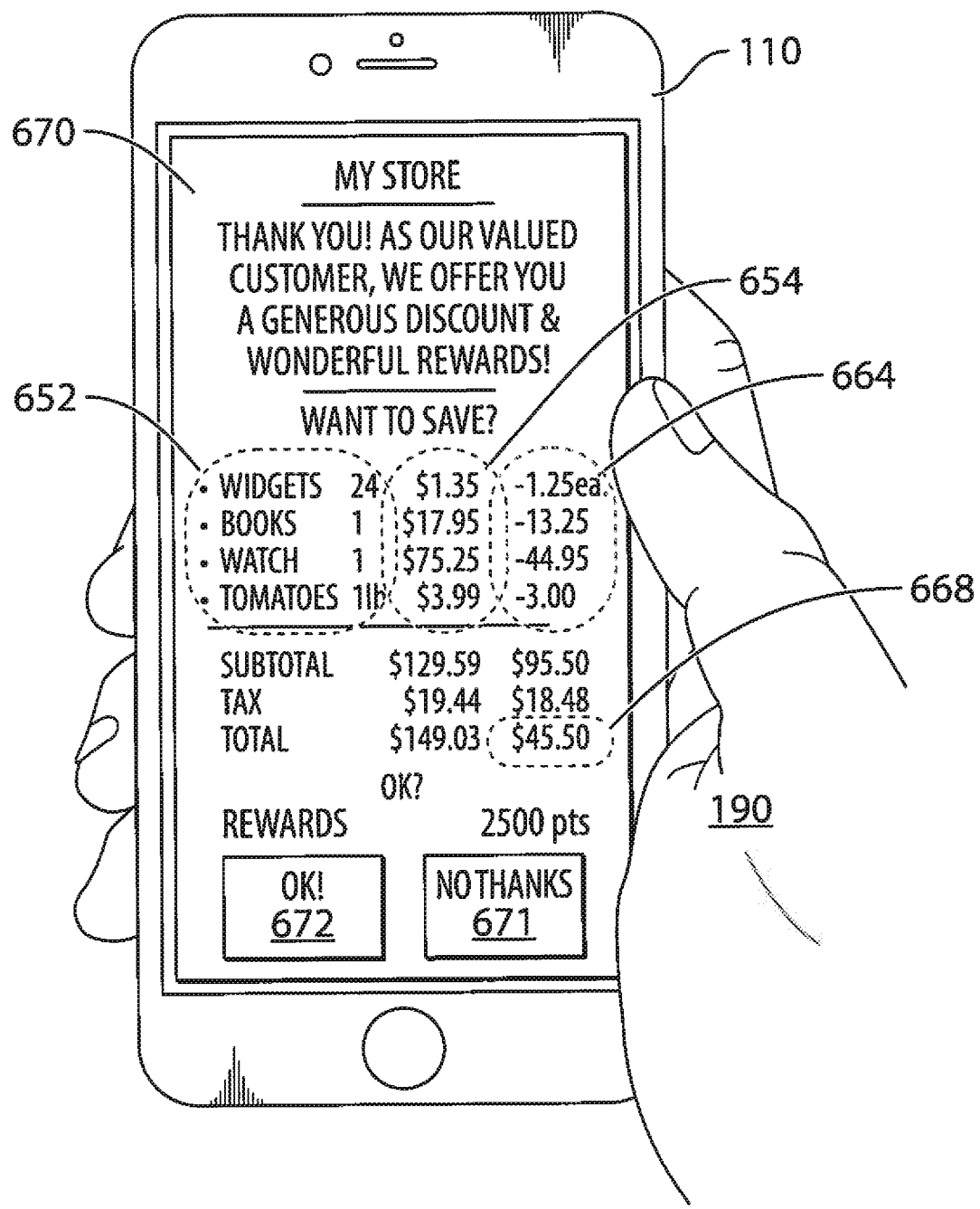

On receipt of a purchaser transaction approval data set, logical structures associated with a merchant application 114 or wallet application 112 can cause processor(s) 302 to generate and display a purchaser approval GUI such as purchaser approval GUI 670 shown in FIG. 9, which includes item list 652, original price terms 654, updated (in this case, discounted) price terms 664, and updated total price 668. Upon satisfactory review and approval of the proposed revised transaction terms, a user 190 can use a command item 672 to generate a purchaser select merchant transaction confirmation data set, which can include a simply yes/no flag, and route the approval to the purchase authorization management system 120. Upon receipt, the system 120 can process any final transaction approvals, account balance updates, etc.

Among the advantages offered by such embodiments of the invention is the ability of a user 190 to decline alternative transaction terms, including discounted prices or modified loyalty wards applications, at any time prior to completion of the purchase (e.g., by selecting command item 672). For example, a user 190 not wishing to accept such modified terms can generate a select merchant offer decline command by selecting a command item 671 "No Thanks" and reverting to terms shown, for example, in GUI 650 of FIG. 8. Alternatively, such a user can avoid consideration of alternative terms altogether by selection of a command item 660 "My Wallet" in a GUI 650, so as to complete transaction execution by, for example, invoicing another payment management application 112.

With a transaction request successfully adjudicated and approved by FI system(s) 120, 160, at 2513-2514a,b,c the system(s) 120, 160 can generate a suitably-formatted transaction confirmation data set and route it to any one or more of merchant backend system(s) 130, 136, POSs 132, 134, and/or merchant application(s) 114. As shown in FIG. 4, such confirmations may be routed over conventional payment rails 150.

Thus it may be seen that in various aspects and embodiments the invention provides networked payment authorization management systems according to the foregoing, configured such that at least one data processor 122 can receive from at least one of a purchaser communication device 110 and a merchant transaction management system 130, using at least one network communication system, a transaction request data set, the transaction data set comprising data representing at least the select merchant payment token and a transaction price, and optionally one or more merchant transaction processing request. In such aspects and embodiments, such select merchant payment tokens can be subject to one or more account eligibility restrictions imposed by the payment authorization management system 120, which may for example be legal, regulatory, or commercial in nature.

The invention further provides, in the same and further aspects and embodiments, networked merchant transaction management systems, such a system comprising processor(s) 137 adapted to receive from purchaser communication devices 110, via one or more one network communication systems 138, merchant transaction processing request confirmation data sets, the merchant transaction processing confirmation data set comprising data representing confirmation of acceptance by a payment authorization management system 120 of one or more merchant transaction processing requests.

It may further be seen from the foregoing that the invention provides purchaser communication devices adapted to receive from merchant transaction management systems 130, using one or more data communications systems 612, 614, data representing goods or services to be purchased from one or more merchants associated with the systems 130, and corresponding price terms; to generate transaction request data sets, such a set comprising data representing at least a select merchant payment token associated with the merchant and a transaction price associated with the corresponding price terms; and, using the same or another data communication system 612, 614, route the transaction request data set to at least one of the merchant transaction management system 130, 132, 134, 136 and one or more payment authorization management systems 120.

As a further example, at 2504 in FIG. 4 the merchant application 114 can access and route to a POS system 132, 134 and/or a merchant system 130 a select merchant payment token returned to the corresponding merchant system 130 at 2422, such token having been stored on the user's device 110, or accessed via the merchant backend system 136, etc. The authorized merchant payment token may be used to generate a transaction authorization request data set as described above, the transaction authorization request data set comprising fields as described above, including a payment type identifier associated with a payment type and/or protocol preferred by the merchant and one or more identifiers associated with funding sources preferred by the user 190. By using a format of the type described above, for example, a discretionary field can be used to identify one or more funding sources preferred by the user.

At 2506, the merchant system 130, 132, 134 can route the transaction authorization request data set generated at 2504 to the FI system(s) 120, 160 associated with the preferred funding source(s) designated by the user in process 2400. By using processes and formats described above, the transaction authorization request data set can be routed over 'conventional' payment network rails 150, and at 2508 interpreted and otherwise processed by components 150 like any other payment request.

At 2508-2514, the requested transaction may be processed and adjudicated in accordance with suitable process(es), including those described above, including for example by checking at 2510 for the availability of adequate funds/points balances in preferred funding source(s) identified by the user 190 and routing approvals at 2512, 2514. Such processes can, for example, include the use of split pay and/or real-time credit processes such as those described.

Merchant authorization and/or application payment tokens in accordance with the invention can be configured to enable the merchant to request that an FI 120 to which the token is routed to perform any of a very wide range of business functions, in addition to or in lieu of payment transactions. For example, through the use of discretionary data fields in accordance with existing or 'conventional' payment protocols, or through the use of specifically-formatted tokens in accordance with the foregoing, the application or award of unique rewards functions, payment refunds, etc., can be executed in accordance within instructions of the corresponding merchant system 130.

Among the many advantages offered by systems and process in accordance with the invention is their provide to adapt to developing technologies. For example, systems and processes in accordance with the invention, combined with suitable security features, may be implemented wholly or partly through the use of various forms of public ledgers, such as blockchains. For example, in some embodiments one or more mPOSs or other trusted devices 110' may be established as a node in a blockchain ledger system. In such an implementation, each trusted device 110', including any trusted mPOSs 134, may route transaction data sets securely from merchant system(s) 130 to FSP systems 160, 120 while complying with applicable blockchain/public ledger protocols.

As will be appreciated by those skilled in the relevant arts, a block chain is a distributed and generally encrypted or otherwise secure data store that acts as a virtual public ledger of transactions, and is particularly useful in implementing cryptocurrencies such as bitcoin. In such ledger schemes a plurality of devices are implemented as node, each node controlling or otherwise having access to a distinct, complete or partial stored copy of the ledger; the ledger comprises data sets representing legal or otherwise recognized tender for transactions. As a transaction progresses, each involved network node can validate the transaction, or a portion of it, and generate data representing suitable ledger annotations, enter the annotations in the node's portion or copy of the ledger, and push or make available updated ledger annotations to other nodes.

The foregoing description is intended to provide a thorough description of various aspects and example embodiments of one or more inventions. Accordingly, various aspects and/or components of such invention(s), and specific exemplary combinations thereof, have been described throughout at multiple different levels of abstraction. In some instances, embodiments may have been described on both a specific and a relatively general or generic level, for example, where an aspect or component of the embodiment is susceptible to variation in a manner that is not inconsistent with the specific structure(s) and/or operation(s) set forth. In these instances, the specific embodiments set forth herein may not be the only ones contemplated and instead may only be exemplary of a more general or generic configuration. The scope of the inventions) described herein is therefore defined solely by the language of the claims appended hereto, giving due consideration to applicable doctrines for construing their meaning.

Moreover, as will be appreciated by those skilled in the relevant arts, a very wide variety of payment systems and transaction processes are enabled by the invention. While various specific combinations and embodiments have been described, it is very much contemplated that they may be used together in a very wide variety of combinations, even where specific combinations have not been described, due to practical concerns for brevity and clarity. As a specific example, the various processes disclosed and otherwise suggested or described can in many instances be implemented in orders or sequences other than those discussed in connection with exemplary embodiments.

It is intended that all such variations which are consistent scope of the claims presented herein are within the scope of the invention.

The invention claimed is:

1. A networked payment authorization management system comprising:
   at least one network communication system;
   at least one data processor; and
   at least one persistent memory device, the at least one persistent memory device comprising stored, machine-interpretable instructions adapted to cause the at least one data processor to:
      receive from a purchaser communication device, using the at least one network communication system, a select merchant payment token request data set, the select merchant payment token request data set comprising data representing:
         one or more purchaser-selected merchant identifiers; and
         one or more purchaser-selected payment source identifiers;
      generate a secure select merchant payment token associated with:
         the one or more purchaser-selected merchant identifiers; and
         the one or more purchaser-selected payment source identifiers;
      generate an authorized merchant payment token data set comprising:
         the secure select merchant payment token;
         the one or more purchaser-selected merchant identifiers; and
         the one or more purchaser-selected payment source identifiers;
      cause the authorized merchant payment token data set to be stored in secure persistent memory;
      using the same or another network communication system, route the authorized merchant payment token data set to the same or another purchaser communication device;
      receive from a merchant transaction management system, using the same or another network communication system, a select merchant token confirmation request, the select merchant token confirmation request comprising data representing:
         the secure select merchant payment token;
         one or more merchant-selected purchaser identifiers; and
         one or more merchant-selected protocols associated with the one or more purchaser-selected payment source identifiers;
      return, using the same or another network communication system, the secure select merchant payment token or a modified selected merchant payment token, to the merchant transaction management system;
      receive, from the merchant transaction management system or the purchaser communication device, a select payment token transaction request data set associated with a transaction between the merchant transaction management system and the purchaser communication device, the select payment token transaction request data set comprising the secure select merchant payment token; and
      process payment for the transaction using the secure select merchant payment token or the modified selected merchant payment token.

2. The networked payment authorization management system of claim 1, the machine-interpretable instructions adapted to further cause the at least one data processor to receive from at least one of the same or another purchaser communication device and a merchant transaction management system, using the at least one network communication system, a transaction request data set, the transaction request data set comprising data representing at least the select merchant payment token and a transaction price.

3. The networked payment authorization management system of claim 2, wherein generating the select merchant payment token is subject to one or more account eligibility restrictions imposed by the networked payment authorization management system.

4. The networked payment authorization management system of claim 3, wherein generating the select merchant payment token is subject to one or more account eligibility restrictions imposed by the networked payment authorization management system.

5. The networked merchant transaction management system of claim 4, wherein the data representing the at least one merchant transaction processing request comprises data representing a loyalty account points award rule applied with respect to transactions associated with transaction request data sets generated by one or more designated purchaser communication devices.

6. The networked merchant transaction management system of claim 5, wherein the machine-interpretable instructions are adapted to cause the at least one data processor to receive from a purchaser communication device, using the at least one network communication system, a merchant transaction processing request confirmation data set, the merchant transaction processing request confirmation data set comprising data representing confirmation of acceptance by a payment authorization management system of one or more merchant transaction processing requests.

7. The networked payment authorization management system of claim 2, wherein at least one of the select merchant payment token request data set and the select merchant token confirmation request comprise data representing a merchant transaction processing request.

8. The networked merchant transaction management system of claim 7, wherein the data representing the at least one merchant transaction processing request comprises data representing a discount to be applied to one or more price terms associated with transaction request data sets generated by one or more designated purchaser communication devices.

9. The networked merchant transaction management system of claim 7, wherein the data representing the at least one merchant transaction processing request comprises data representing a loyalty account points award rule applied with respect to transactions associated with transaction request data sets generated by one or more designated purchaser communication devices.

10. The networked merchant transaction management system of claim 9, wherein the machine-interpretable instructions are adapted to cause the at least one data processor to receive from a purchaser communication device, using the at least one network communication system, a merchant transaction processing request confirmation data set, the merchant transaction processing request confirmation data set comprising data representing confirmation of acceptance by a payment authorization management system of one or more merchant transaction processing requests.

11. The networked payment authorization management system of claim 1, wherein at least one of the select merchant payment token request data set and the select merchant token confirmation request comprise data representing a merchant transaction processing request.

12. The networked payment authorization management system of claim 11, wherein generating the select merchant payment token is subject to one or more account eligibility restrictions imposed by the networked payment authorization management system.

13. The networked merchant transaction management system of claim 12, wherein the data representing the at least one merchant transaction processing request comprises data representing a discount to be applied to one or more price terms associated with transaction request data sets generated by one or more designated purchaser communication devices.

14. The networked merchant transaction management system of claim 12, wherein the data representing the at least one merchant transaction processing request comprises data representing a loyalty account points award rule applied with respect to transactions associated with transaction request data sets generated by one or more designated purchaser communication devices.

15. The networked merchant transaction management system of claim 14, wherein the machine-interpretable instructions are adapted to cause the at least one data processor to receive from a purchaser communication device, using the at least one network communication system, a merchant transaction processing request confirmation data set, the merchant transaction processing request confirmation data set comprising data representing confirmation of acceptance by a payment authorization management system of one or more merchant transaction processing requests.

16. The networked merchant transaction management system of claim 11, wherein the data representing the at least one merchant transaction processing request comprises data representing a discount to be applied to one or more price terms associated with transaction request data sets generated by one or more designated purchaser communication devices.

17. The networked merchant transaction management system of claim 11, wherein the data representing the at least one merchant transaction processing request comprises data representing a loyalty account points award rule applied with respect to transactions associated with transaction request data sets generated by one or more designated purchaser communication devices.

18. The networked merchant transaction management system of claim 17, wherein the machine-interpretable instructions are adapted to cause the at least one data processor to receive from a purchaser communication device, using the at least one network communication system, a merchant transaction processing request confirmation data set, the merchant transaction processing request confirmation data set comprising data representing confirmation of acceptance by a payment authorization management system of one or more merchant transaction processing requests.

19. The networked payment authorization management system of claim 1, wherein generating the select merchant payment token is subject to one or more account eligibility restrictions imposed by the networked payment authorization management system.

* * * * *